US008000476B2

(12) United States Patent
Shimosato et al.

(10) Patent No.: US 8,000,476 B2
(45) Date of Patent: Aug. 16, 2011

(54) DATA ENCRYPTION/DECRYPTION METHOD, AND DEVICE

(75) Inventors: Tsutomu Shimosato, Kanagawa (JP); Yujiro Ito, Kanagawa (JP)

(73) Assignee: Sony Corporation, Tokyo (JP)

( * ) Notice: Subject to any disclaimer, the term of this patent is extended or adjusted under 35 U.S.C. 154(b) by 460 days.

(21) Appl. No.: 10/483,361

(22) PCT Filed: May 7, 2003

(86) PCT No.: PCT/JP03/05679
§ 371 (c)(1),
(2), (4) Date: Jan. 9, 2004

(87) PCT Pub. No.: WO03/096611
PCT Pub. Date: Nov. 20, 2003

(65) Prior Publication Data
US 2005/0069133 A1 Mar. 31, 2005

(30) Foreign Application Priority Data

May 10, 2002 (JP) ................................. 2002-135092
Jun. 14, 2002 (JP) ................................. 2002-173523

(51) Int. Cl.
*H04M 3/16* (2006.01)
*H04L 9/08* (2006.01)
(52) U.S. Cl. ......... 380/260; 380/284; 380/274; 713/168
(58) Field of Classification Search .................. 380/284, 380/255, 43, 274; 713/168
See application file for complete search history.

(56) References Cited

U.S. PATENT DOCUMENTS

| 5,081,678 | A | * | 1/1992 | Kaufman et al. | ............. 713/161 |
| 5,161,189 | A | * | 11/1992 | Bray et al. | ..................... 380/270 |
| 5,864,625 | A | * | 1/1999 | Rutledge | ......................... 380/31 |
| 5,915,018 | A | * | 6/1999 | Aucsmith | ..................... 380/201 |
| 6,263,437 | B1 | * | 7/2001 | Liao et al. | ..................... 713/169 |
| 6,289,102 | B1 | * | 9/2001 | Ueda et al. | ..................... 380/201 |
| 6,336,189 | B1 | * | 1/2002 | Takeda et al. | ..................... 726/2 |
| 6,567,730 | B2 | * | 5/2003 | Tanaka | ............................. 701/33 |
| 6,654,883 | B1 | * | 11/2003 | Tatebayashi | .................. 713/168 |

(Continued)

FOREIGN PATENT DOCUMENTS

JP 61 29233 2/1986

(Continued)

OTHER PUBLICATIONS

Japanese Office Action dated Apr. 6, 2010.

(Continued)

*Primary Examiner* — Gilberto Barron, Jr.
*Assistant Examiner* — Cordelia Zecher
(74) *Attorney, Agent, or Firm* — Frommer Lawrence & Haug LLP; William S. Frommer; Ellen Marcie Emas

(57) ABSTRACT

A method of enciphering data which is applicable to cipher-transmission of digital information data, in which the HD-SDI signal DHS is subjected to enciphering process using common key data DEY which is common to encipherment and decipherment to produce enciphered HD-SDI signal DHSE, the common key data DEY are subjected to enciphering process using open key data DOY to produce enciphered common key data DXY, and the enciphered HD-SDI signal DHSE accompanied with the enciphered common key data DXY are send to be transmitted, so that such a fear that the common key data DEY are eavesdropped on the transmission thereof can be effectively reduced.

19 Claims, 8 Drawing Sheets

U.S. PATENT DOCUMENTS

2002/0021805 A1 * 2/2002 Schumann et al. ........... 380/201

FOREIGN PATENT DOCUMENTS

| | | |
|---|---|---|
| JP | 63-070634 | 3/1988 |
| JP | 2-122745 | 5/1990 |
| JP | 4-211543 | 8/1992 |
| JP | 7-77933 | 3/1995 |
| JP | 2000-50363 | 2/2000 |
| JP | 2001-148732 | 5/2001 |

OTHER PUBLICATIONS

Bruce Schneier, Applied Cryptography: Protocols, Algorithms, and Source Code in C, 1996, pp. 48, 173 Second Edition, John Wiley & Sons, Inc.

* cited by examiner

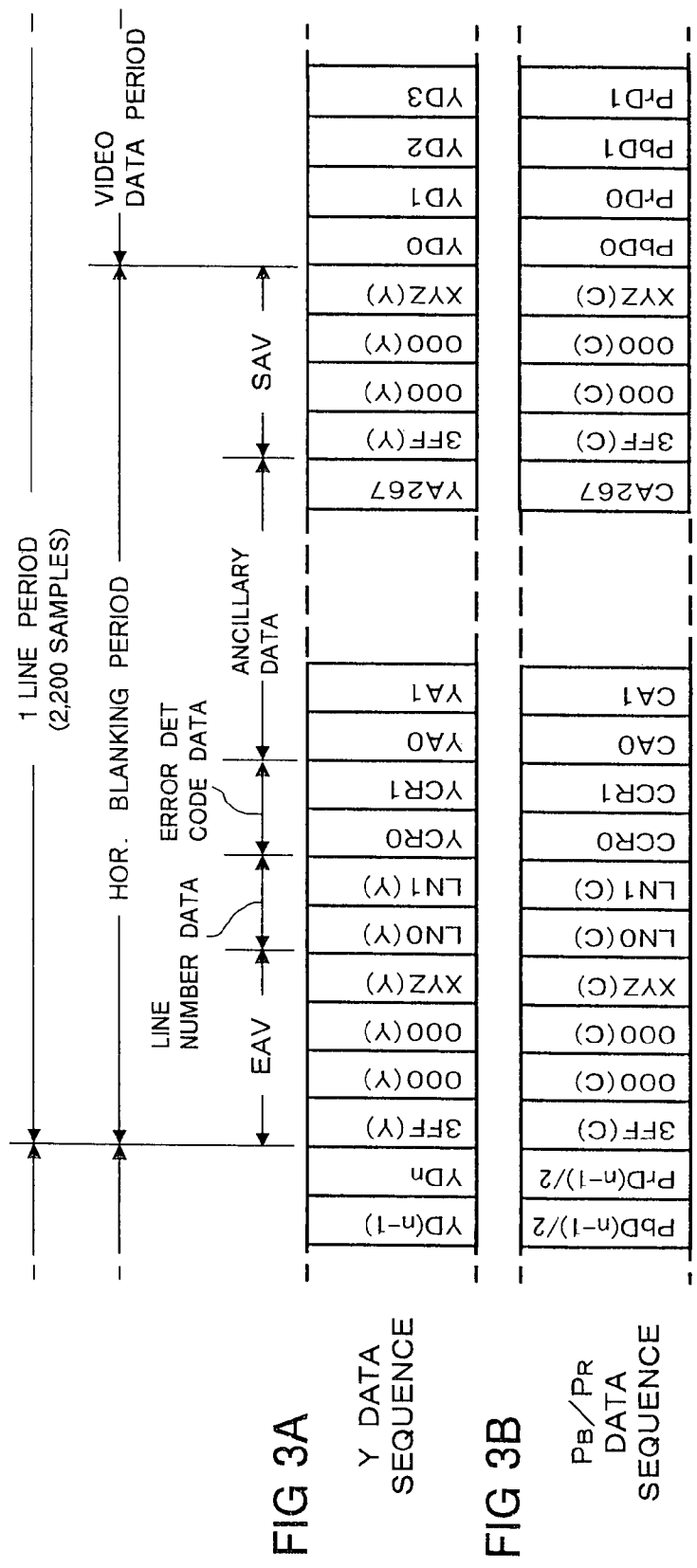

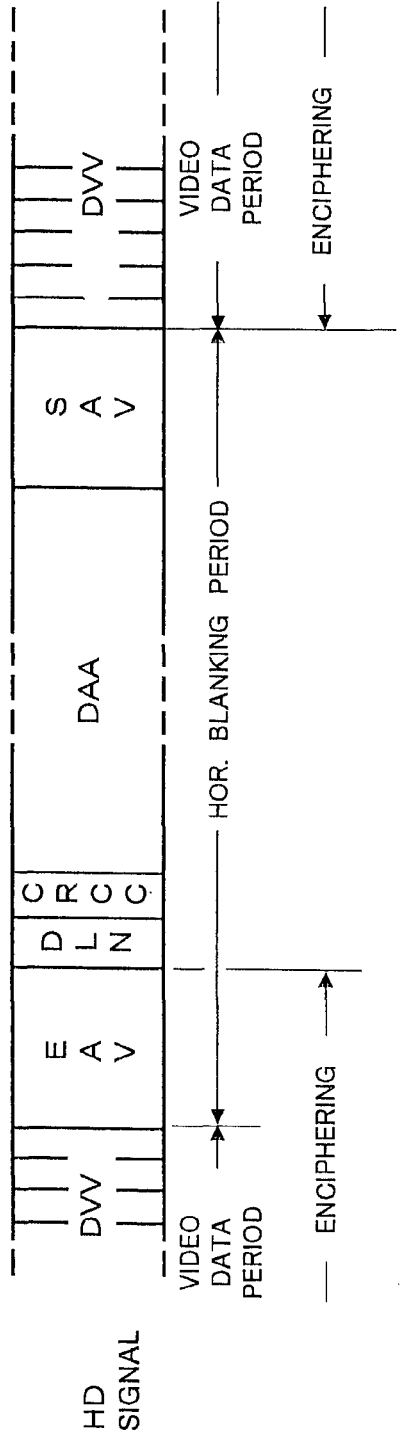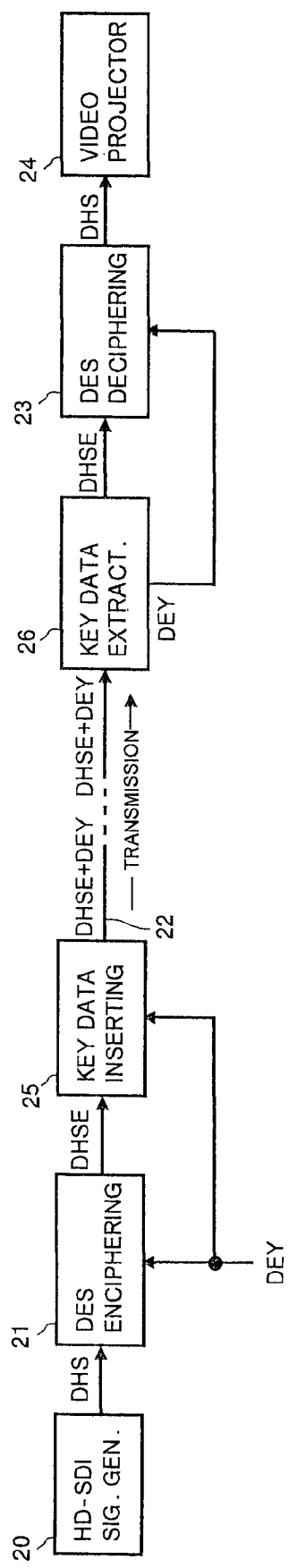

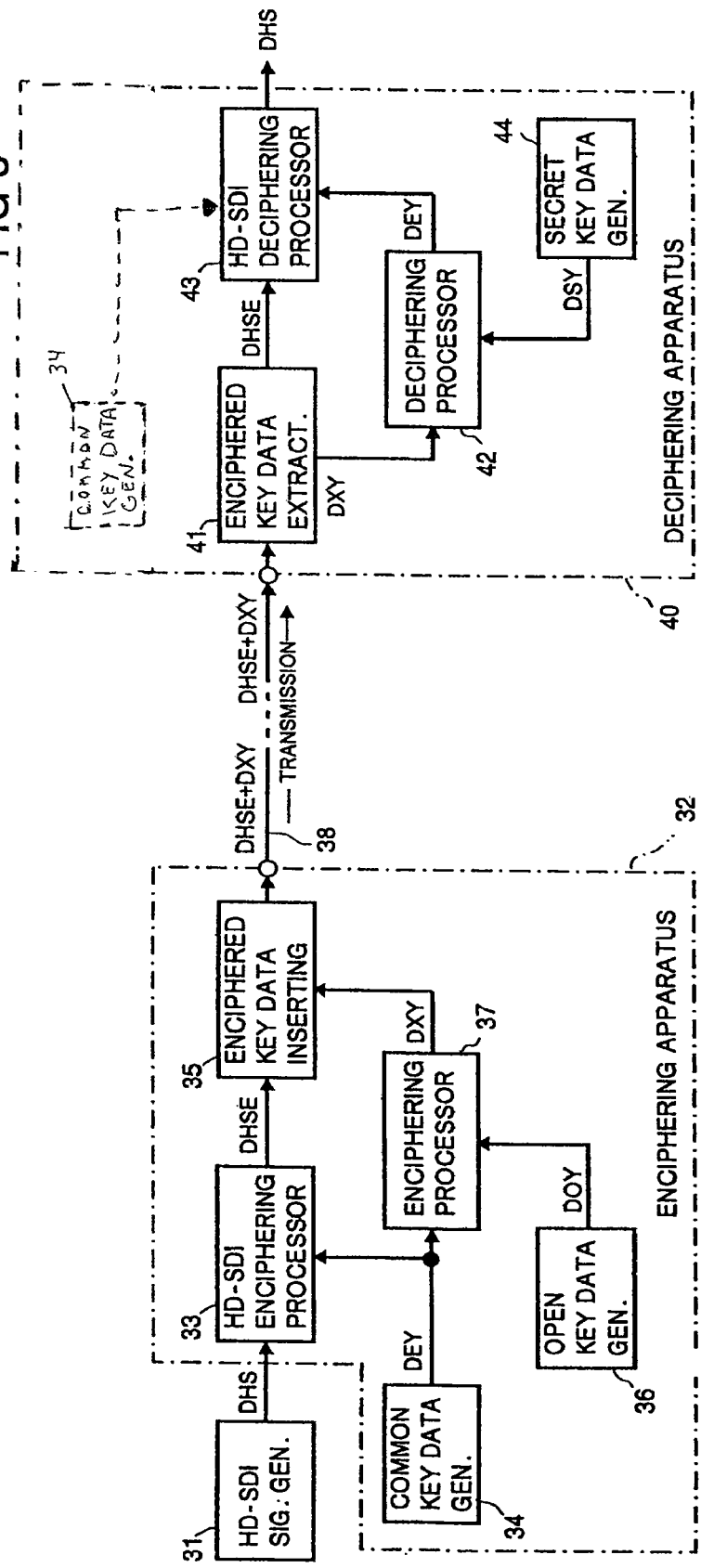

US 8,000,476 B2

DATA ENCRYPTION/DECRYPTION METHOD, AND DEVICE

This application is a 371 application of PCT/JP03/05679 filed May 7, 2003 which claims the benefit of priority to Japanese Application No. JP 2002-135092 filed May 10, 2002 and JP 2002-173523 filed Jun. 14, 2002.

TECHNICAL FIELD

The present invention relates to a method of enciphering data for subjecting digital information data to enciphering process to produce enciphered digital information data, an apparatus for enciphering data in which the method of enciphering data is carried out, a method of deciphering data for subjecting enciphered digital information data to deciphering process to reproduce original digital information data, an apparatus for deciphering data in which the method of deciphering data is carried out, a method of enciphering and deciphering data corresponding to a combination of the above-mentioned method of enciphering data with the above-mentioned method of deciphering data, or an apparatus for enciphering and deciphering data in which the method of enciphering and deciphering data is carried out.

TECHNICAL BACKGROUND

In the field of data transmission by which digital data representing various kinds of signal information are transmitted, there have been proposed to subject digital data which are to be transmitted to enciphering process at a transmission side and to reproduce original data by subjecting the enciphered digital data to deciphering process at a receiving side, in order to prevent the digital data from being eavesdropped on a data transmission line. Typical algorisms for enciphering digital data are the DES (Date Encryption Standard) published in 1977 by the National Bureau of Standards, the United State of America, and the RSA (Rivest, Shamir, Adleman) published in 1978 by the Massachusetts Institute of Technology.

With cipher-transmission based on the DES, digital data are enciphered in accordance with the rules determined by enciphering key data prepared previously to produce enciphered digital data and the enciphered digital data are deciphered in accordance with the rules determined by deciphering key data prepared previously to reproduce original digital data. The deciphering key data are prepared to be the same as the enciphering key data so that each of the deciphering key data and the enciphering key data are formed with common data (common key data). Although the algorisms for enciphering and deciphering have been opened to the public, the common key data are kept in secret for the purpose of enciphering.

With cipher-transmission based on the RSA, digital data are enciphered in accordance with the rules determined by enciphering key data to produce enciphered digital data and the enciphered digital data are deciphered in accordance with the rules determined by deciphering key data which has contents different from those of the opened enciphering key data to reproduce original digital data. Although the enciphering key data are not kept in secret to be open key data, the deciphering key data are kept in secret to be secret key data for the purpose of enciphering.

FIG. 1 shows a basic structure of a cipher-transmission system according to the DES. In the basic structure shown in FIG. 1, digital data to be transmitted are supplied to a DES enciphering portion 11 as original data. Common key data prepared previously are also supplied to the DES enciphering portion 11. In the DES enciphering portion 11, the original data are subjected to the DES enciphering process in accordance with the rules determined by the common key data to produce enciphered data. The enciphered data obtained from the DES enciphering portion 11 are transmitted through a data transmission line 12 having one end thereof connected with the DES enciphering portion 11.

The enciphered data having been transmitted through the data transmission line 12 are supplied to a DES deciphering portion 13 with which the other end of the data transmission line 12 is connected. The common key data which is the same as the common key data supplied to the DES enciphering portion 11 are also supplied to the DES deciphering portion 13. In the DES deciphering portion 13, the enciphered data are subjected to the DES deciphering process in accordance with the rules determined by the common key data to reproduce the original data.

FIG. 2 shows a basic structure of a cipher-transmission system according to the RSA. In the basic structure shown in FIG. 2, digital data to be transmitted are supplied to an RSA enciphering portion 14 as original data. Open key data prepared previously are also supplied to the RSA enciphering portion 14. In the RSA enciphering portion 14, the original data are subjected to the RSA enciphering process in accordance with the rules determined by the open key data to produce enciphered data. The enciphered data obtained from the RSA enciphering portion 14 are transmitted through a data transmission line 15 having one end thereof connected with the DES enciphering portion 11.

The enciphered data having been transmitted through the data transmission line 15 are supplied to an RSA deciphering portion 16 with which the other end of the data transmission line 15 is connected. Secret key data which have contents different from those of the open key data supplied to the RSA enciphering portion 14 are also supplied to the RSA deciphering portion 16. In the RSA deciphering portion 16, the enciphered data are subjected to the RSA deciphering process in accordance with the rules determined by the secret key data to reproduce the original data.

In the case of the DES enciphering and deciphering, the quantity of operations for enciphering data and deciphering enciphered data is relatively small and therefore high speed proceeding can be performed. On the other hand, in the case of the RSA enciphering and deciphering, the quantity of operations for enciphering data and deciphering enciphered data is relatively large and therefore high speed proceeding can not be expected.

In the field of video signals, digitalization of video signals has been aimed for actualizing diversification in information to be transmitted, improvements in quality of images reproduced from the video signal and so on. For example, there has been proposed the High Definition Television (HDTV) system which uses a digital video signal composed of digital word sequence data representing video signal information. The digital video signal under the HDTV system (hereinafter, referred to the HD signal) is formed in accordance with, for example, the BTA S-002 which is one of a series of standards established by the Broadcasting Technology Association (BTA) in Japan so as to be in the form of Y and $P_B/P_R$ signals or G, B and R signals. In the case of the Y and $P_B/P_R$ signals, Y represents a luminance signal and $P_B/P_R$ represent color difference signals. In the case of the G, B and R signals, G, B and R represent green, blue and red primary color signals, respectively.

The HD signal is a digital television signal by which each frame picture is formed with first and second field pictures each appearing at a rate of 60 Hz and which is constituted in accordance with an arrangements including a frame rate of 30 Hz, 1125 lines per frame, 2,200 data samples per line and a sampling frequency of 74.25 MHz. For example, the HD signal in the form of Y and $P_B/P_R$ signals is constituted in accordance with such data formats as shown in FIGS. 3A and 3B.

The data formats shown in FIGS. 3A and 3B include a part of a portion corresponding to a line period (hereinafter, referred to a line period portion) of a luminance signal data sequence (hereinafter, referred to a Y data sequence) as shown in FIG. 3A, which represents a luminance signal component of a video signal, and a part of a line period portion of a color difference signal data sequence (hereinafter, referred a $P_B/P_R$ data sequence) as shown in FIG. 3B, which represents color difference signal components of the video signal. Each of data words constituting the Y data sequence or the $P_B/P_R$ data sequence is composed of 10 bits. This means that each of the Y data sequence and the $P_B/P_R$ data sequence constitutes 10-bit word sequence data having a word transmission rate of, for example, 74.25 Mwps.

In the Y data sequence shown in FIG. 3A, each line period portion of which is formed with a portion corresponding to a horizontal blanking period and a portion corresponding to a video data period appearing after the horizontal blanking period, time reference code data SAV (Start of Active Video) which are composed of four 10-bit words (3FF(Y), 000(Y), 000(Y), XYZ(Y): 3FF and 000 are hexadecimal numbers and (Y) indicates a word contained in the Y data sequence) are provided just before the portion corresponding to the video data period and another time reference code data EAV (End of Active Video) which are composed of four 10-bit words (3FF(Y), 000(Y), 000(Y), XYZ(Y)) are provided just after the portion corresponding to the video data period. Similarly, in the $P_B/P_R$ data sequence shown in FIG. 3B, each line period portion of which is formed with a portion corresponding to a horizontal blanking period and a portion corresponding to a video data period appearing after the horizontal blanking period, time reference code data SAV which are composed of four 10-bit words (3FF(C), 000(C), 000(C), XYZ(C): (C) indicates a word contained in the $P_B/P_R$ data sequence) are provided just before the portion corresponding to the video data period and another time reference code data EAV which are composed of four 10-bit words (3FF(C), 000(C), 000(C), XYZ(C)) are provided just after the portion corresponding to the video data period. The time reference code data EAV and SAV contained in the Y data sequence are provided in the portion corresponding to the horizontal blanking period of the Y data sequence and the time reference code data EAV and SAV contained in the $P_B/P_R$ data sequence are provided in the portion corresponding to the horizontal blanking period of the $P_B/P_R$ data sequence.

Initial three 10-bit words (3FF, 000, 000) of four 10-bit words (3FF, 000, 000, XYA), each of which is shown with (Y) or (C), are used for establishing word synchronization or line synchronization and a last one 10-bit word (XYZ) of four 10-bit words (3FF, 000, 000, XYA), which is also shown with (Y) or (C), is used for discriminating the first field from the second field in each frame or for discriminating the time reference code data EAV from the time reference code data SAV.

In the portion corresponding to the horizontal blanking period in each of the Y data sequence and the $P_B/P_R$ data sequence, line number data LN0(Y) and LN1(Y) or LN0(C) and LN1(C) which represent the number of each of line period portions constituting a frame period portion, error detection code data YCR0 and YCR1 or CCR0 and CCR1, and ancillary data YA0, YA1, ..., YA267 or CA0, CA1, ..., CA267 including audio data are provided between the time reference code data EAV and the time reference code data SAV.

When the HD signal constituted with the Y data sequence and the $P_B/P_R$ data sequence is subjected to transmission through a data transmission line, it is desired for the HD signal to be converted to serial data from word sequence data so as to be subjected to serial transmission through a simplified data transmission line. In connection with the serial transmission of the HD signal constituted with the Y data sequence and the $P_B/P_R$ data sequence, it has been standardized to transmit the HD signal in conformity with the HD SDI (High Definition Serial Digital Interface) according to the BTA S-004 which is one of a series of standards established by the BTA in Japan.

In the transmission of the HD signal in conformity with the HD SDI, the Y data sequence and the $P_B/P_R$ data sequence are multiplexed, with their portions corresponding to the horizontal blanking periods in each of which the time reference code data EAV and SAV are provided and which synchronize with each other, to produce a multiple word sequence data as shown in FIG. 4 and then the multiple word sequence data are converted into serial data to be transmitted. Each of data words constituting the multiple word sequence data shown in FIG. 4 is composed of 10 bits and the word transmission rate of the multiple word sequence shown in FIG. 4 is set to be 74.25 Mwps×2=148.5 Mwps. In the multiple word sequence data thus obtained as shown in FIG. 4, multiple time reference code data (multiple SAV) which are composed of eight 10-bit words (3FF(C), 3FF(Y), 000(C), 000(Y), 000(C), 000(Y), XYZ(C), XYZ(Y)) are provided just before the portion corresponding to a video data period and another multiple time reference code data EAV (multiple EAV) which are composed of eight 10-bit words (3FF(C), 3FF(Y), 000(C), 000(Y), 000(C), 000(Y), XYZ(C), XYZ(Y)) are provided just after the portion corresponding to the video data period.

The each of the 10-bit words constituting the multiple word sequence data is sent bit by bit from its least significant bit (LSB) to its most significant bit (MSB) so that the multiple word sequence data are converted into a serial data. Then, the serial data is subjected to scrambling process to produce a serial transmission HD signal (hereinafter, referred to an HD-SDI signal) and the HD-SDI signal is transmitted through a data transmission line. The HD-SDI signal thus transmitted has a bit transmission rate of, for example, 148.5 Mwps× 10=1.485 Gbps.

In the case of the transmission of the HD-SDI signal through the data transmission line, it is also desired to subject the HD-SDI signal to enciphering process at a transmission side and to reproduce original HD-SDI signal by subjecting the enciphered HD-SDI signal to deciphering process at a receiving side, in order to prevent the HD-SDI signal from being eavesdropped on the data transmission line. It may be said that the DES enciphering and the EDS deciphering are suitable for the cipher-transmission of the HD-SDI signal because high speed proceeding is desired for enciphering the HD-SDI signal and deciphering the enciphered HD-SDI signal. When the DES enciphering and the EDS deciphering are applied for the cipher-transmission of the HD-SDI signal, a cipher-transmission system which is similar to the cipher-transmission system according to the DES having the basic structure shown in FIG. 1 can be theoretically used.

For example, when an HD signal is converted into an HD-SDI signal in accordance with the HD SDI to be transmitted through a data transmission line and the transmitted HD-SDI signal is reconverted into the HD signal in accordance with the HD SDI to be supplied to, for example, a video projector which operates to display images based on the HD signal, it is considered to have such a cipher-transmission system as shown in FIG. 5 for conducting the cipher-transmission of the HD-SDI signal.

In the cipher-transmission system shown in FIG. 5, an HD-SDI signal DHS sent from an HD-SDI signal generating portion 20, in which an HD signal obtained from a video camera or the like is converted into the HD-SDI signal DHS in accordance with the HD SDI, is supplied to a DES enciphering portion 21 for HD-SDI signal. Common key data DEY prepared previously are also supplied to the DES enciphering portion 21 for HD-SDI signal. In the DES enciphering portion 21 for HD-SDI signal, the HD-SDI signal DHS is first subjected to serial to parallel (S/P) conversion to reproduce the original HD signal constituted with Y and $P_B/P_R$ data sequences and the reproduced HD signal is subjected to the DES enciphering process in accordance with the rules determined by the common key data DEY to produce an enciphered HD signal. Then, in the DES enciphering portion 21 for HD-SDI signal, the enciphered HD signal is subjected to parallel to serial (P/S) conversion to produce an enciphered HD-SDI signal DHSE.

When the enciphered HD signal is produced by subjecting the HD signal to the DES enciphering process, for example, video data DVV which are provided in a portion corresponding to a video data period and time reference code date EAV which are provided in a starting end of a portion corresponding to a horizontal blanking period successive to the portion corresponding to the video data period in a portion corresponding to a line period of an HD signal constituted with Y and $P_B/P_R$ data sequences shown in FIGS. 3A and 3B, as shown in FIG. 6, are subjected to the DES enciphering process to produce an enciphered video data. On the other hand, various data provided in the portion corresponding to the horizontal blanking period except the time reference code date EAV, that is, line number data DLN representing a line number varying line by line, error detection code data CRCC, ancillary data DAA including audio data, and time reference code data SAV, are not subjected to the DES enciphering process but combined with the enciphered video data. As a result, the enciphered HD signal which contains the various data provided in the portion corresponding to the horizontal blanking period except the time reference code date EAV and the enciphered video data successive to the portion corresponding to the horizontal blanking period is obtained.

The enciphered HD-SDI signal DHSE is sent from the DES enciphering portion 21 for HD-SDI signal to be transmitted through a data transmission line 22 having one end thereof connected with the DES enciphering portion 21 for HD-SDI signal.

The enciphered HD-SDI signal DHSE having been transmitted through the data transmission line 22 is supplied to a DES deciphering portion 23 for HD-SDI signal, with which the other end of the data transmission line 22 is connected. The common key data DEY which is the same as those supplied to the DES enciphering portion 21 are also supplied to the DES deciphering portion 23. In the DES deciphering portion 23, the enciphered HD-SDI signal DHSE is subjected to the S/P conversion to reproduce the enciphered HD signal constituted with the enciphered Y and $P_B/P_R$ data sequences each containing the enciphered video data and the enciphered HD signal is subjected to the DES deciphering process in accordance with the rules determine ed by the common key data DEY to reproduce the original HD signal constituted with the Y and $P_B/P_R$ data sequences.

When the HD signal constituted with the Y and $P_B/P_R$ data sequences is reproduced by subjecting the enciphered HD signal to the DES deciphering process, the enciphered video data in the portion corresponding to the horizontal blanking period of the enciphered HD signal are subjected to the DES deciphering process to reproduce the original video data and time reference code data EAV. On the other hand, the various data provided in the portion corresponding to the horizontal blanking period except the time reference code date EAV, that is, the line number data DLN representing the line number varying line by line, the error detection code data CRCC, the ancillary data DAA including the audio data, and the time reference code data SAV, are not subjected to the DES deciphering process but extracted as they are to be combined with the reproduced video data and time reference code data EAV. As a result, the original HD signal as shown in FIG. 6 is obtained.

Then, in the DES deciphering portion 23 for HD-SDI signal, the Y and $P_B/P_R$ data sequences constituting the reproduced HD signal are multiplexed with each other in accordance with the HD SDI to produce a word multiple data sequence and the word multiple data sequence thus obtained are subjected to the P/S conversion to reproduce the HD-SDI signal DHS.

The HD-SDI signal DHS obtained from the DES deciphering portion 23 for HD-SDI signal is supplied to a video projector 24. In the video projector 24, the HD signal is reproduced from the HD-SDI signal DHS and used for display of images.

In such a manner as described above, when the DES enciphering and the DES deciphering are applied for the cipher-transmission of the HD-SDI signal, it is required that the common key data DEY are supplied to both of the DES enciphering portion 21 for HD-SDI signal and the DES deciphering portion 23 for HD-SDI. Therefore, it is necessary to transmit the common key data DEY supplied to the DES enciphering portion 21 for HD-SDI signal through some means toward the DES deciphering portion 23 for HD-SDI to be supplied thereto.

Accordingly, it is considered to transmit the common key data DEY, together with the enciphered HD-SDI signal DHSE obtained from the DES enciphering portion 21 for HD-SDI, from the side of the DES enciphering portion 21 for HD-SDI to the side of DES deciphering portion 23 for HD-SDI through the data transmission line 22. FIG. 7 shows a cipher-transmission system for transmitting the common key data DEY, together with the enciphered HD-SDI signal DHSE obtained from the DES enciphering portion 21 for HD-SDI, from the side of the DES enciphering portion 21 for HD-SDI to the side of DES deciphering portion 23 for HD-SDI through the data transmission line 22.

In the cipher-transmission system shown in FIG. 7, a key data inserting portion 25 is provided at the output end of the DES enciphering portion 21 for HD-SDI signal in which the HD-SDI signal DHS sent from the HD-SDI signal generating portion 20 is subjected to the DES enciphering process in accordance with the rules determined by the common key data DEY to produce the enciphered HD-SDI signal DHSE, and a key data extracting portion 26 is provided at the input end of a DES deciphering portion 23 for HD-SDI signal. In the key data inserting portion 25 to which the enciphered HD-SDI signal DHSE obtained from the DES enciphering portion 21 for HD-SDI signal and the common key data DEY are supplied, the common key data DEY are inserted into the enciphered HD-SDI signal DHSE so that the enciphered HD-SDI signal DHSE and the common key data DEY are transmitted through the data transmission line 22 to the DES deciphering portion 23 for HD-SDI signal.

In the key data extracting portion 26, the common key data DEY are extracted from the enciphered HD-SDI signal DHSE and the common key data DEY. The enciphered HD-SDI signal DHSE having passed through the key data extracting portion 26 and the common key data DEY obtained from the key data extracting portion 26 are supplied to the DES deciphering portion 23 for HD-SDI signal. In the DES deciphering portion 23 for HD-SDI signal, the enciphered HD-SDI signal DHSE is subjected to the DES deciphering process in accordance with the rules determined by the common key data DEY to reproduce the HD-SDI signal DHS to be supplied to the video projector 24.

However, in the case wherein the common key data DEY are transmitted from the side of the DES enciphering portion 21 for HD-SDI to the side of DES deciphering portion 23 for HD-SDI through the data transmission line 22 as mentioned above, it is much feared that the common key data DEY are eavesdropped on the data transmission line 22 by a mala fide holder and the enciphered HD-SDI signal DHSE sent from the DES enciphering portion 21 for HD-SDI signal is undesirably deciphered with the eavesdropped common key data DEY. This problem brings about serious obstacle to the cipher-transmission of the HD-SDI signal for which the DES enciphering and the DES deciphering are applied.

Accordingly, it is an object of the present invention to provide a method of enciphering data which is applicable to cipher-transmission of digital information data such as an HD-SDI signal, in which the digital information data are subjected to enciphering process using common key data or data corresponding to the common key data to produce enciphered digital information data to be transmitted in an enciphering portion, the enciphered digital information data are subjected to deciphering process using the common key data or the data corresponding to the common key data to reproducing the original digital information data in a deciphering portion, and the common key data or the data corresponding to the common key data are transmitted from the side of the enciphering portion to the side of the deciphering portion, and by which such a fear that the common key data or the data corresponding to the common key data are eavesdropped on the transmission thereof and the enciphered digital information data are undesirably deciphered with the eavesdropped common key data can be effectively reduced.

Another object of the present invention is to provide an apparatus for enciphering data in which the method of enciphering data mentioned above is carried out.

A further object of the present invention is to provide a method of deciphering data which is applicable to cipher-transmission of digital information data such as an HD-SDI signal, in which the digital information data are subjected to enciphering process using common key data or data corresponding to the common key data to produce enciphered digital information data to be transmitted in an enciphering portion, the enciphered digital information data are subjected to deciphering process using the common key data or the data corresponding to the common key data to reproducing the digital information data in a deciphering portion, and the common key data or the data corresponding to the common key data are transmitted from the side of the enciphering portion to the side of the deciphering portion, and by which the original digital information data can be surely reproduced based on the enciphered digital information data.

A further object of the present invention is to provide an apparatus for deciphering data in which the method of deciphering data mentioned above is carried out.

A further object of the present invention is to provide a method of enciphering and deciphering data corresponding to a combination of the above-mentioned method of enciphering data with the above-mentioned method of deciphering data.

A still further object of the present invention is to provide an apparatus for enciphering and deciphering data in which the method of enciphering and deciphering data mentioned above is carried out.

DISCLOSURE OF THE INVENTION

According to one embodiment of the present application, there is provided a method of enciphering data, which comprises the steps of subjecting digital information data to enciphering process using key data for producing enciphered information data, subjecting the common key data to enciphering process using open key data for producing enciphered common key data, and sending the enciphered information data and the enciphered common key data.

According to another embodiment of the present application, there is provided a method of enciphering data, which comprises the steps of subjecting digital information data to scrambling process using M-sequence (Maximum length sequence) code having its initial value determined in accordance with M-sequence code initial value data for producing enciphered information data, subjecting the M-sequence code initial value data to enciphering process using open key data for producing enciphered M-sequence code initial value data, and sending the enciphered information data and the enciphered M-sequence code initial value data.

According to a further embodiment of the present application, there is provided a method of deciphering data, which comprises the steps of receiving enciphered information data and enciphered key data, subjecting the enciphered key data to deciphering process using secret key data for reproducing original key data, and subjecting the enciphered information data to deciphering process using the reproduced original key data for reproducing original digital information data.

According to still another embodiment of the present application, there is provided a method of deciphering data, which comprises the steps of receiving enciphered information data and enciphered M-sequence code initial value data, subjecting the enciphered M-sequence code initial value data to deciphering process using secret key data for reproducing original M-sequence code initial value data, and subjecting the enciphered information data to descrambling process using M-sequence code having its initial value determined in accordance with the reproduced original M-sequence code initial value data for reproducing original digital information data.

According to an additional embodiment of the present application, there is provided a method of enciphering and deciphering data, which comprises the steps of subjecting digital information data to enciphering process using common key data for producing enciphered information data, subjecting the common key data to enciphering process using open key data for producing enciphered common key data, sending the enciphered information data and the enciphered common key data, receiving the enciphered information data and the enciphered common key data, subjecting the enciphered common key data to deciphering process using secret key data for reproducing the common key data, and subjecting the enciphered information data to deciphering process using the reproduced common key data for reproducing the digital information data.

According to another embodiment of the present application, there is provided a method of enciphering and deciphering data, which comprises the steps of subjecting digital information data to scrambling process using M-sequence code having its initial value determined in accordance with M-sequence code initial value data for producing enciphered information data, subjecting the M-sequence code initial value data to enciphering process using open key data for producing enciphered M-sequence code initial value data, sending the enciphered information data and the enciphered M-sequence code initial value data, receiving the enciphered information data and the enciphered M-sequence code initial value data, subjecting the enciphered M-sequence code initial value data to deciphering process using secret key data for reproducing the M-sequence code initial value data, and subjecting the enciphered information data to descrambling process using M-sequence code having its initial value determined in accordance with the reproduced M-sequence code initial value data to reproduce the digital information data.

According to a further embodiment of the present application, there is provided an apparatus for enciphering data, which comprises a common key data generating portion for sending key data, a first enciphering processor for subjecting digital information data to first enciphering process using the key data obtained from the key data generating portion for producing enciphered information data, a second enciphering processor for subjecting the key data obtained from the key data generating portion to second enciphering process using open key data for producing enciphered key data, and data sending portion for sending the enciphered information data and the enciphered key data.

According to an additional embodiment of the present application, there is provided an apparatus for enciphering data, which comprises an M-sequence code initial value data generating portion for sending M-sequence code initial value data, a first enciphering processor for subjecting digital information data to scrambling process using M-sequence code having its initial value determined in accordance with the M-sequence code initial value data obtained from the M-sequence code initial value data generating portion for producing enciphered information data, a second enciphering processor for subjecting the M-sequence code initial value data obtained from the M-sequence code initial value data generating portion to enciphering process using open key data for producing enciphered M-sequence code initial value data, and a data sending portion for sending the enciphered information data and the enciphered M-sequence code initial value data.

According to another embodiment of the present application, there is provided an apparatus for deciphering data, which comprises a data receiving portion for receiving enciphered information data and enciphered key data, a secret key data generating portion for sending secret key data, a first deciphering processor for subjecting the enciphered key data to deciphering process using the secret key data obtained from the secret key data generating portion for reproducing original key data, and a second enciphering portion for subjecting the enciphered information data to deciphering process using the reproduced original key data for reproducing original digital information data.

According to an additional embodiment of the present application, there is provided an apparatus for deciphering data, which comprises a data receiving portion for receiving enciphered digital information data and enciphered M-sequence code initial value data, a secret key data generating portion for sending secret key data, a first deciphering processor for subjecting the enciphered M-sequence code initial value data to descrambling process using the secret key data obtained from the secret key data generating portion for reproducing original M-sequence code initial value data, and a second deciphering processor for subjecting the enciphered information data to deciphering process using M-sequence cod having its initial value determined in accordance with the reproduced original M-sequence code initial value data for reproducing original digital information data.

According to a further embodiment of the present application, there is provided an apparatus of enciphering and deciphering data, which comprises a common key data generating portion for sending common key data, a first enciphering processor for subjecting digital information data to first enciphering process using the common key data obtained from the common key data generating portion for producing enciphered information data, a second enciphering processor for subjecting the common key data obtained from the common key data generating portion to second enciphering process using open key data for producing enciphered common key data, data sending portion for sending the enciphered information data and the enciphered common key data, a data receiving portion for receiving the enciphered information data and the enciphered common key data, a secret key data generating portion for sending secret key data, a first deciphering processor for subjecting the enciphered common key data to deciphering process using the secret key data obtained from the secret key data generating portion for reproducing the common key data, and a second enciphering portion for subjecting the enciphered information data to deciphering process using the reproduced common key data for reproducing the digital information data.

According to still another embodiment of the present application, there is provided an apparatus for enciphering and deciphering data, which comprises an M-sequence code initial value data generating portion for sending M-sequence code initial value data, a first enciphering processor for subjecting digital information data to scrambling process using M-sequence code having its initial value determined in accordance with the M-sequence code initial value data obtained from the M-sequence code initial value data generating portion for producing enciphered information data, a second enciphering processor for subjecting the M-sequence code initial value data obtained from the M-sequence code initial value data generating portion to enciphering process using open key data for producing enciphered M-sequence code initial value data, a data sending portion for sending the enciphered information data and the enciphered M-sequence code initial value data, a data receiving portion for receiving the enciphered information data and the enciphered M-sequence code initial value data, a secret key data generating portion for sending secret key data, a first deciphering processor for subjecting the enciphered M-sequence code initial value data to descrambling process using the secret key data obtained from the secret key data generating portion for reproducing the M-sequence code initial value data, and a second deciphering processor for subjecting the enciphered information data to deciphering process using M-sequence code having its initial value determined in accordance with the reproduced M-sequence code initial value data for reproducing the digital information data.

In the method of enciphering data or the apparatus for enciphering data the key data which are used for the enciphering process for producing the enciphered information data are subjected to the enciphering process using the open key data to produce the enciphered common key data and the enciphered key data are sent separately from or in accompany with the enciphered information data. Consequently, the original key data can be reproduced by subjecting the enciphered key data to the deciphering process using the secret key data to be used for the deciphering process to which the enciphered information data are subjected to reproduce the original digital information data, and such a fear that the key data are eavesdropped on its transmission and the enciphered information data are undesirably deciphered with the eavesdropped key data can be effectively reduced.

In the method of enciphering data or the apparatus for enciphering data the M-sequence code initial value data which are used for the scrambling process using the M-sequence code for producing the enciphered information data are subjected to the enciphering process using the open key data to produce the enciphered M-sequence code initial value data and the M-sequence code initial value data are sent separately from or in accompany with the enciphered information data. Consequently, the original M-sequence code initial value data can be reproduced by subjecting the enciphered M-sequence code initial value data to the deciphering process using the secret key data to be used for the descrambling process to which the enciphered information data are subjected to reproduce the original digital information data, and such a fear that the M-sequence code initial value data are eavesdropped on its transmission and the enciphered information data are undesirably descrambled with the M-sequence code having the initial value determined in accordance with the eavesdropped M-sequence code initial value data can be effectively reduced.

In the method of deciphering data or the apparatus for deciphering data, the enciphered key data which are produced through the enciphering process using the open key data are subjected to the deciphering process using the secret key data to reproduce the original key data and the original key data are used for the deciphering process to which the enciphered information data are subjected to reproduce the original digital information data. Consequently, the original digital information data can be surely reproduced based on the enciphered information data with which such a fear as to be undesirably deciphered is effectively reduced.

In the method of deciphering data or the apparatus for deciphering data, the enciphered M-sequence code initial value data which are produced through the enciphering process using the open key data are subjected to the deciphering process using the secret key data to reproduce the original M-sequence code initial value data and the original M-sequence code initial value data are used for the descrambling process using the M-sequence code to which the enciphered information data are subjected to reproduce the original digital information data. Consequently, the original digital information data can be surely reproduced based on the enciphered information data with which such a fear as to be undesirably deciphered is effectively reduced.

In the method of enciphering and deciphering data or the apparatus for enciphering data, common key data which are used for the enciphering process for producing the enciphered information data are subjected to the enciphering process using the open key data to produce the enciphered common key data and the enciphered common key data are sent separately from or in accompany with the enciphered information data, and the enciphered common key data which are produced through the enciphering process using the open key data are subjected to the deciphering process using the secret key data to reproduce the original common key data and the original common key data are used for the deciphering process to which the enciphered information data are subjected to reproduce the original digital information data. Consequently, such a fear that the common key data are eavesdropped on its transmission and the enciphered information data are undesirably deciphered with the eavesdropped common key data can be effectively reduced and the original digital information data can be surely reproduced based on the enciphered information data.

In the method of enciphering and deciphering data or the apparatus for enciphering data, the M-sequence code initial value data which are used for the scrambling process using the M-sequence code for producing the enciphered information data are subjected to the enciphering process using the open key data to produce the enciphered M-sequence code initial value data and the M-sequence code initial value data are sent separately from or in accompany with the enciphered information data, and the enciphered M-sequence code initial value data which are produced through the enciphering process using the open key data are subjected to the deciphering process using the secret key data to reproduce the original M-sequence code initial value data and the original M-sequence code initial value data are used for the descrambling process using the M-sequence code to which the enciphered information data are subjected to reproduce the original digital information data. Consequently, such a fear that the M-sequence code initial value data are eavesdropped on its transmission and the enciphered information data are undesirably descrambled with the M-sequence code having the initial value determined in accordance with the eavesdropped M-sequence code initial value data can be effectively reduced and the original digital information data can be surely reproduced based on the enciphered information data.

BRIEF DESCRIPTION OF THE DRAWINGS

FIGS. 3A and 3B are illustrations used for explaining an example of data format of an HD signal;

FIG. 6 is an illustration showing an example of data format of an HD signal;

FIG. 7 is a schematic block diagram showing another example of the cipher-transmission system applicable to the cipher-transmission of an HD-SDI signal;

FIG. 8 is a block diagram showing an embodiment of apparatus for enciphering and deciphering data, in which an embodiment of method of enciphering and deciphering data is carried out, and which includes an embodiment of apparatus for enciphering data, in which an embodiment of method of enciphering data is carried out, and an embodiment of apparatus for deciphering data, in which an embodiment of method of deciphering data is carried out;

EMBODIMENTS MOST PREFERABLE FOR WORKING OF THE INVENTION

Figure 1:
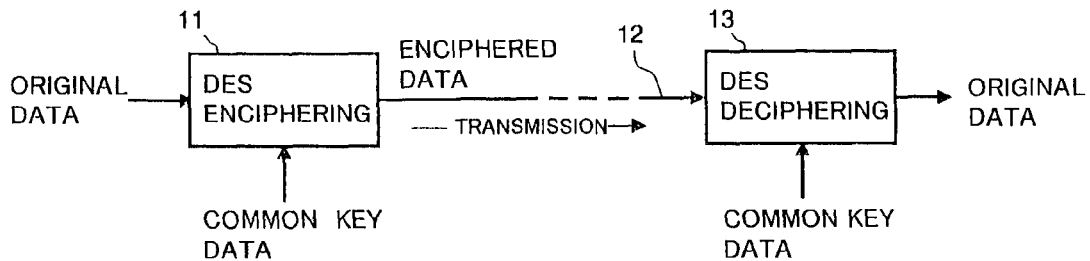
FIG. 1 is a schematic block diagram showing a basic structure of a cipher-transmission system according to the DES.
Figure 2:
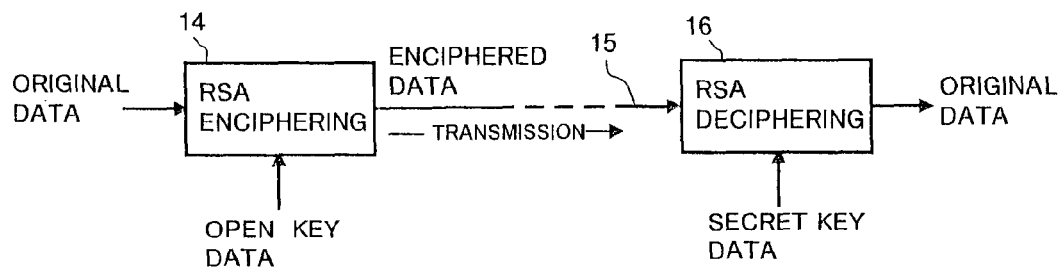
FIG. 2 is a schematic block diagram showing a basic structure of a cipher-transmission system according to the RSA.
Figure 5:
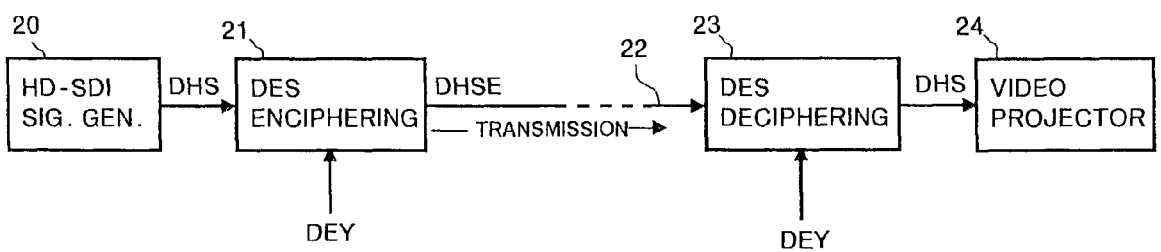
FIG. 5 is a schematic block diagram showing an example of a cipher-transmission system applicable to the cipher-transmission of an HD-SDI signal.
Figure 4:
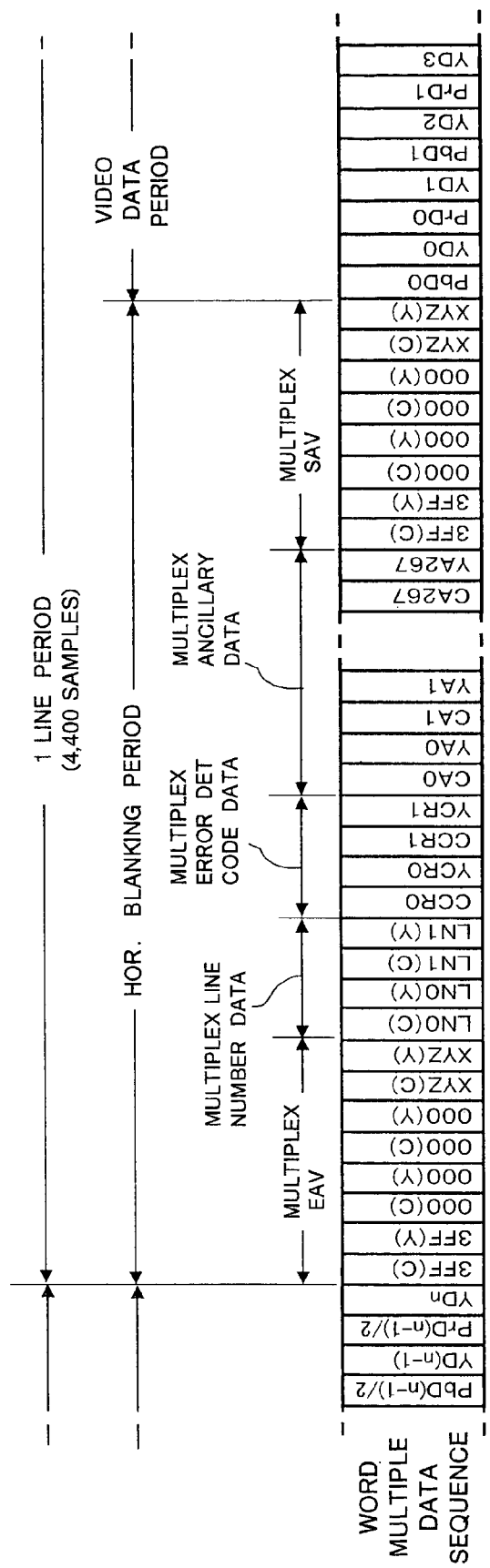
FIG. 4 is an illustration used for explaining another example of data format of an HD signal.

FIG. 8 shows an embodiment of apparatus for enciphering and deciphering data, in which an embodiment of method of enciphering and deciphering data is carried out, and which includes an embodiment of apparatus for enciphering data, in which an embodiment of method of enciphering data is carried out, and an embodiment of apparatus for deciphering data, in which an embodiment of method of deciphering data is carried out.

Referring to FIG. 8, an HD-SDI signal generating portion 31 is provided for sending an HD-SDI signal DHS which constitutes digital information data. The HD-SDI signal DHS obtained from the HD-SDI signal generating portion 31 is supplied, as input digital information data, to an enciphering apparatus 32 which constitutes an embodiment of apparatus for enciphering data, in which an embodiment of method of enciphering data is carried out.

In the enciphering apparatus 32, a common key data generating portion 34 is provided for sending common key data DEY which are common to encipherment and decipherment of data. The HD-SDI signal DHS obtained from the HD-SDI signal generating portion 31 and the common key data DEY obtained from the common key data generating portion 34 are supplied to an HD-SDI enciphering processor 33.

In the HD-SDI enciphering processor 33, the HD-SDI signal DHS is subjected to enciphering process using the common key data DEY to produce an enciphered HD-SDI signal DHSE which constitutes enciphered information data based on the HD-SDI signal DHS to be supplied to an enciphered key data inserting portion 35.

The decipherment of the HD-SDI signal DHS in the HD-SDI enciphering processor 33 is carried out in such a manner as mentioned below.

First, the HD-SDI signal DHS is subjected to S/P conversion to be converted into an HD signal as shown in FIG. 6 which contains Y and $P_B/P_R$ data sequences as shown in FIGS. 3A and 3B.

Next, a portion of the HD signal as shown in FIG. 6, which includes video data DVV provided in a portion corresponding to a video data period and time reference code date EAV provided in a starting end of a portion corresponding to a horizontal blanking period in a portion corresponding to a line period of the HD signal, is subjected to the enciphering process in accordance with the rules determined by the common key data DEY to produce enciphered video data. On the other hand, various data provided in the portion corresponding to the horizontal blanking period except the time reference code date EAV, that is, line number data DLN, error detection code data CRCC, ancillary data DAA and time reference code data SAV, are not subjected to the enciphering process but combined with the enciphered video data. As a result, enciphered HD signal which contains the various data provided in the portion corresponding to the horizontal blanking period except the time reference code date EAV and the enciphered video data successive to the portion corresponding to the horizontal blanking period is obtained. Then, the enciphered HD signal thus obtained is subjected to S/P conversion to be converted into the enciphered HD-SDI signal DHSE.

An open key data generating portion 36 is also provided for sending open key data DOY in the enciphering apparatus 32. The common key data DEY obtained from the common key data generating portion 34 and the open key data DOY obtained from the open key data generating portion 36 are supplied to an enciphering processor 37.

In the enciphering processor 37, the common key data DEY are subjected to enciphering process using the open key data DOY, that is, enciphering process in accordance with the rules determined by the open key data DOY, to produce enciphered common key data DXY to be supplied to the enciphered key data inserting portion 35.

In the enciphered key data inserting portion 35, the enciphered common key data DXY are inserted into the enciphered HD-SDI signal DHSE from the HD-SDI enciphering processor 33 to produce composite enciphered HD-SDI signal DHSE+DXY which is the enciphered HD-SDI signal DHSE accompanied with the enciphered common key data DXY. The composite enciphered HD-SDI signal DHSE+DXY are sent from the enciphered key data inserting portion 35 to be transmitted from the enciphering apparatus 32. Therefore, the enciphered key data inserting portion 35 constitutes a data sending portion for sending the enciphered HD-SDI signal DHSE and the enciphered common key data DXY to be transmitted.

The composite enciphered HD-SDI signal DHSE+DXY obtained from the enciphered key data inserting portion 35 are transmitted from the enciphering apparatus 32 through a data transmission line 38 having one end thereof connected with the enciphered key data inserting portion 35 toward the other end of the data transmission line 38. The data transmission line 38 is formed with, for example, a coaxial cable.

The other end of the data transmission line 38 is connected to a deciphering apparatus 40 which constitutes an embodiment of apparatus for deciphering data, in which an embodiment of method of deciphering data is carried out.

In the deciphering apparatus 40, the composite enciphered HD-SDI signal DHSE+DXY, which is the enciphered HD-SDI signal DHSE accompanied with the enciphered common key data DXY, having been transmitted through the data transmission line 38 is supplied to an enciphered key data extracting portion 41. The enciphered key data extracting portion 41 is operative to receive the composite enciphered HD-SDI signal DHSE+DXY and to extract the enciphered common key data DXY from the composite enciphered HD-SDI signal DHSE+DXY. The enciphered common key data DXY obtained from the enciphered key data extracting portion 41 are supplied to a deciphering processor 42 and the enciphered HD-SDI signal DHSE obtained also from the enciphered key data extracting portion 41 is supplied to an HD-SDI deciphering processor 43. Therefore, the enciphered key data extracting portion 41 constitutes a data receiving portion for receiving the enciphered HD-SDI signal DHSE and the enciphered common key data DXY.

A secret key data generating portion 44 is provided also in the deciphering apparatus 40 for sending secret key data DSY which are in a specific corresponding relation with the open key data DOY obtained from the open key data generating portion 36. The secret key data DSY obtained from the secret key data generating portion 44 are supplied to the deciphering processor 42. In the deciphering processor 42, the enciphered common key data DXY are subjected to deciphering process using the secret key data DSY, that is, deciphering process in accordance with the rules determined by the secret key data DSY, to reproduce the original common key data DEY to be supplied to the HD-SDI deciphering processor 43.

In the HD-SDI deciphering processor 43, the enciphered HD-SDI signal DHSE obtained from the enciphered key data extracting portion 41 is subjected to deciphering process using the reproduced common key data DEY to reproduce the original HD-SDI signal DHS.

The decipherment of the enciphered HD-SDI signal DHSE in the HD-SDI deciphering processor 43 is carried out in such a manner as mentioned below.

First, the enciphered HD-SDI signal DHSE is subjected to S/P conversion to be converted into the enciphered HD signal.

Next, the enciphered video data which include the enciphered video data DVV and the enciphered time reference code date EAV in a portion corresponding to a line period of the enciphered HD signal, is subjected to the deciphering process in accordance with the rules determined by the common key data DEY to reproduce the original video data DVV and the original time reference code date EAV. The various data provided in the portion corresponding to the horizontal blanking period except the time reference code date EAV, that is, the line number data DLN, the error detection code data CRCC, the ancillary data DAA and the time reference code data SAV, which have not been enciphered, are combined with the reproduced video data VDD and the reproduced time reference code date EAV. As a result, the HD signal, each portion corresponding to the line period of which contains the time reference code data EAV, the line number data DLN, the error detection code data CRCC, the ancillary data DAA and the time reference code data SAV provided in the portion corresponding to the horizontal blanking period and the video data DVV, is obtained. Then, the HD signal thus obtained is subjected to P/S conversion to be converted into the HD-SDI signal DHS.

The HD-SDI signal DHS thus reproduced in the HD-SDI deciphering processor 43 is sent from the deciphering apparatus 40.

Figure 9:
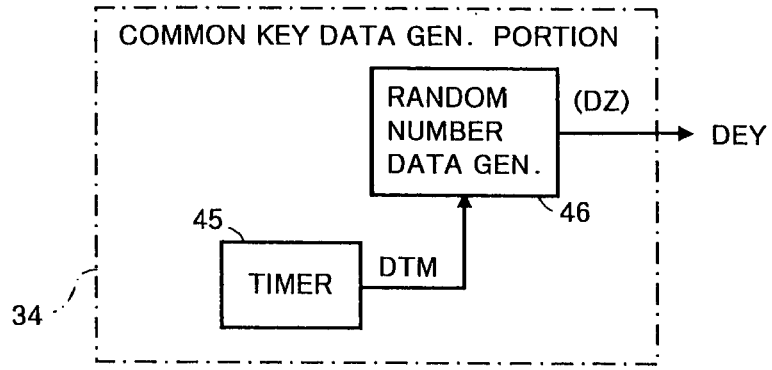
FIG. 9 is a schematic block diagram showing a first embodied structure of a common key data generating portion in the embodiment of apparatus for enciphering data shown in FIG. 8.

FIG. 9 shows a first embodied structure of the common key data generating portion 34 in the enciphering apparatus 32 shown in FIG. 8.

In the case where the enciphering apparatus 32 shown in FIG. 8 is constituted with the common key data generating portion 34 having the first embodied structure shown in FIG. 9, the structure of the enciphering apparatus 32 thus constituted corresponds to an embodiment of apparatus for enciphering data, in which an embodiment of method of enciphering data is carried out.

The first embodied structure of the common key data generating portion 34 shown in FIG. 9 is constituted with a timer 45 and a random number data generating portion 46 to which a timer output data DTM obtained from the timer 45 are supplied. In the random number data generating portion 46, random number data DZ which varies in response to the timer output data DTM which varies successively in accordance with the counting operation of the timer 45 are generated to be sent as the common key data DEY. That is, the random number data DZ which are renewed successively in response to the counting operation of the timer 45 are obtained as the common key data DEY from the first embodied structure of the common key data generating portion 34 shown in FIG. 9.

Figure 10:
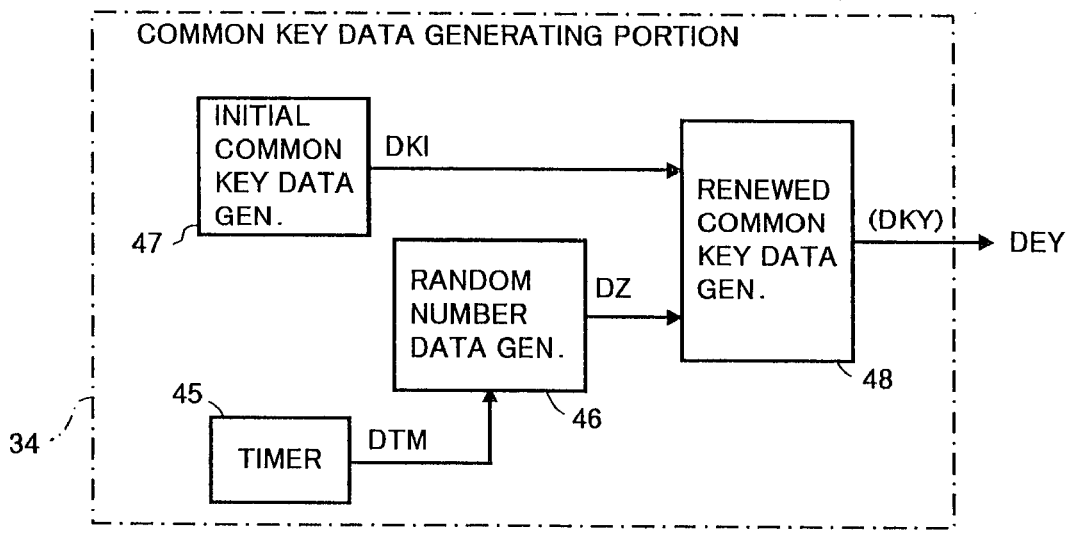
FIG. 10 is a schematic block diagram showing a second embodied structure of the common key data generating portion in the embodiment of apparatus for enciphering data shown in FIG. 8.

FIG. 10 shows a second embodied structure of the common key data generating portion 34 in the enciphering apparatus 32 shown in FIG. 8.

In the case where the enciphering apparatus 32 shown in FIG. 8 is constituted with the common key data generating portion 34 having the second embodied structure shown in FIG. 10, the structure of the enciphering apparatus 32 thus constituted corresponds to an embodiment of apparatus for enciphering data, in which an embodiment of method of enciphering data is carried out.

The second specific configuration example of the common key data generating portion 34 shown in FIG. 10 is applied to a situation where initial common key data are previously set to each of the enciphering apparatus 32 and the deciphering apparatus 40. The initial common key data, for example, at the start of the transmission of the enciphered HD-SDI signal DHSE+DXY from the enciphering apparatus 32 to the deciphering apparatus 40, in a situation where it takes predetermined time for the deciphering processor 42 to perform reproduction of the original common key data DXY for encipherment and decipherment on the basis of the enciphered common key data DXY for encipherment and decipherment in the deciphering processor 42 of the deciphering apparatus 40, during a period when the common key data DXY for encipherment and decipherment is not obtained from the deciphering processor 42, in place of the common key data DEY for encipherment and decipherment to be obtained from the deciphering processor 42, is used for denciphering process to which the enciphered HD-DSI signal DHSE is subjected in the HD-SDI enciphering processor 43.

In the second embodied structure of the common key data generating portion 34 shown in FIG. 10, an initial common key data generating portion 47 for sending predetermined initial common key data DKI and a renewed common key data generating portion 48 are provided in addition to a timer 45 and a random number data generating portion 46 which correspond to the timer 45 and the random number data generating portion 46 shown in FIG. 9, respectively. The initial common key data DKI obtained from the initial common key data generating portion 47 and the random number data DZ which varies successively in response to the counting operation of the timer 45 and obtained from the random number data generating portion 46 are supplied to the renewed common key data generating portion 48.

In the renewed common key data generating portion 48, renewed common key data DKY which are successively renewed with the random number data DZ based on the initial common key data DKI are generated. The renewed common key data DKY obtained from the renewed common key data generating portion 48 are sent from the common key data generating portion 34 which includes the timer 45, the random number data generating portion 46, the initial common key data generating portion 47 and the renewed common key data generating portion 48. That is, the renewed common key data DKY which are renewed in accordance with the random number data DZ so as to be obtained based on the initial common key data DKI and the random number data DZ are obtained as the enciphered common key data DEY from the second embodied structure of the common key data generating portion 34 shown in FIG. 10.

Figure 11:
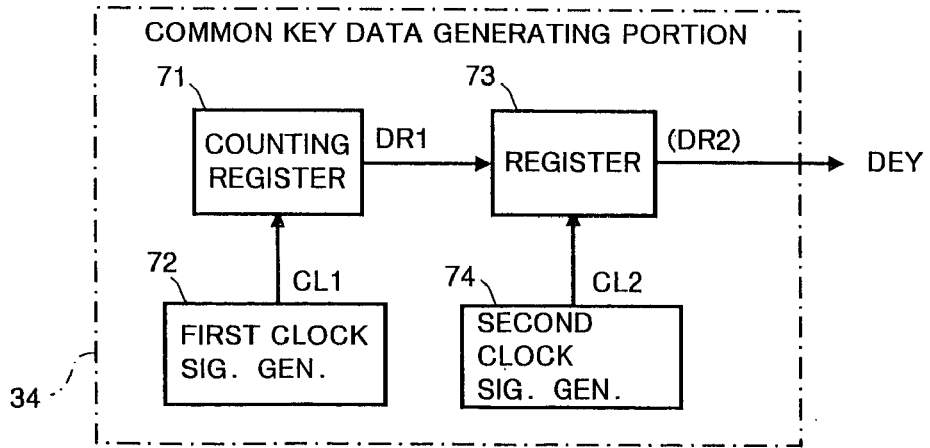
FIG. 11 is a schematic block diagram showing a third embodied structure of the common key data generating portion in the embodiment of apparatus for enciphering data shown in FIG. 8.

FIG. 11 shows a third embodied structure of the common key data generating portion 34 in the enciphering apparatus 32 shown in FIG. 8.

In the case where the enciphering apparatus 32 shown in FIG. 8 is constituted with the common key data generating portion 34 having the third embodied structure shown in FIG. 11, the structure of the enciphering apparatus 32 thus constituted corresponds to an embodiment of apparatus for enciphering data, in which an embodiment of method of enciphering data is carried out.

The third embodied structure of the common key data generating portion 34 shown in FIG. 11 is constituted with a counting register 71 from which a register value data DRI are obtained, a first clock signal generating portion 72 for supplying the counting register 71 with a clock signal CL1, a register 73 to which the register value data DRI obtained from the counting register 71 are supplied, and a second clock signal generating portion 74 for supplying the register 73 with a clock signal CL2. The clock signal CL1 obtained from the first clock signal generating portion 72 has a frequency higher than that of the clock signal CL2 obtained from the second clock signal generating portion 74.

The register value data DRI obtained from the counting register 71 represent a value corresponding to a count value obtained by counting the clock signal CL1 supplied from the first clock signal generating portion 72. In the register 73, the register value data DRI supplied from the counting register 71 are latched in accordance with the clock signal CL2 supplied from the second clock signal generating portion 74 and the latched register value data DRI are obtained as register value data DR2.

In such a case, in each of the first and second clock signal generating portions 72 and 74, a clock signal generating operation is not always stable but varies delicately due to differences in operational characteristic and in temperature characteristic among various circuit devices constituting the first and second clock signal generating portions 72 and 74. These delicate variations in the clock signal generating operation in each of the first and second clock signal generating portions 72 and 74 bring about variations in the register value data DRI obtained from the counting register 71 and variations in the register value data DR2 obtained from the register 73. As a result, the register value data DR2 obtained from the register 73 represent complicated value varying irregularly. Especially, the register value data DR2 obtained from the register 73 are put in utter confusion after the counting register 71 has operated for a relatively ling time. In such a manner as mentioned above, the register value data DR2 obtained from the register 73 constitute a random number data sequence composed of a series of random number data so as to lack reproducibility and produced in response to the second clock signal CL2 obtained from the second clock signal generating portion 74.

The random number data contained in the register value data DR2 obtained from the register 73 to constitute the random number data sequence are sent as the enciphered common key data DEY from the common key data generating portion which includes the counting register 71, the first clock signal generating portion 72, the register 73 and the second clock signal generating portion 74. That is, the random number data which are contained in the random number data sequence formed to lack reproducibility and renewed successively are sent as the enciphered common key data DEY from the third embodied structure of the common key data generating portion 34 shown in FIG. 11.

Figure 12:
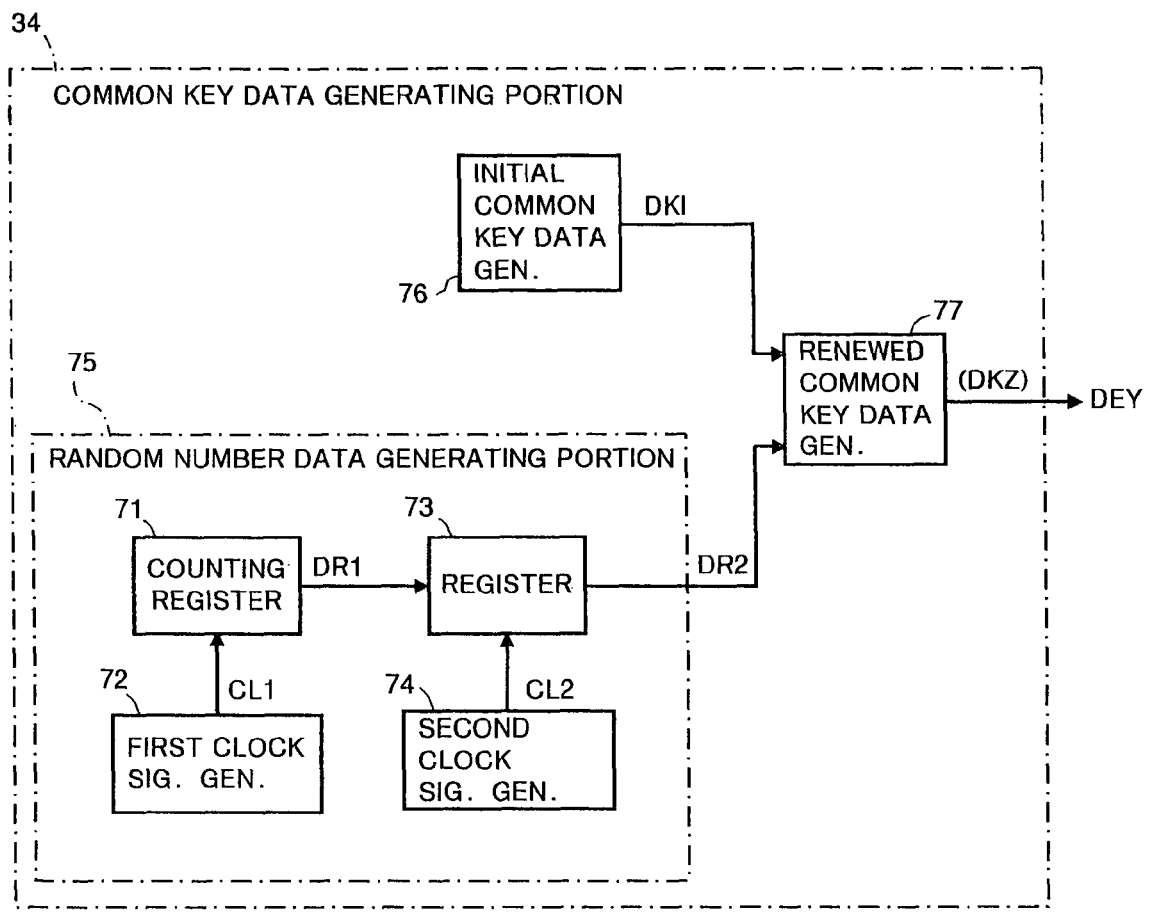
FIG. 12 is a schematic block diagram showing a fourth embodied structure of the common key data generating portion in the embodiment of apparatus for enciphering data shown in FIG. 8.

FIG. 12 shows a fourth embodied structure of the common key data generating portion 34 in the enciphering apparatus 32 shown in FIG. 8.

In the case where the enciphering apparatus 32 shown in FIG. 8 is constituted with the common key data generating portion 34 having the fourth embodied structure shown in FIG. 12, the structure of the enciphering apparatus 32 thus constituted corresponds to an embodiment of apparatus for enciphering data, in which an embodiment of method of enciphering data is carried out.

The fourth embodied structure of the common key data generating portion 34 shown in FIG. 12 is applied to each of the enciphering apparatus 32 and the deciphering apparatus 40 when the aforementioned initial common key data are previously set.

In the fourth embodied structure of the common key data generating portion 34 shown in FIG. 12, an initial common key data generating portion 76 for sending predetermined initial common key data DKI and a renewed common key data generating portion 77 are provided in addition to a random number data generating portion 75 which is constituted with a counting register 71, a first clock signal generating portion 72, a register 73 and a second clock signal generating portion 74 in the same manner as the common key data generating portion 34 shown in FIG. 11. The initial common key data DKI obtained from the initial common key data generating portion 76 and random number data contained in register value data DR2 sent from the register 73 to constitute the random number data sequence lacking reproducibility and obtained from the random number data generating portion 75 are supplied to the renewed common key data generating portion 77.

In the renewed common key data generating portion 77, renewed common key data DKZ which are successively renewed with the random number data contained in the register value data DR2 based on the initial common key data DKI are generated. The renewed common key data DKZ obtained from the renewed common key data generating portion 77 are sent as enciphered common key data DEY from the common key data generating portion 34 which includes the random number data generating portion 75, the initial common key data generating portion 76 and the renewed common key data generating portion 77. That is, the renewed common key data DKZ, which are renewed in accordance with the random number data contained in the register value data DR2 which are obtained from the random number data generating portion 75 to constitute the random number data sequence lacking reproducibility and constituted with the initial common key data DKI and the random number data contained in the register value data DR2, are obtained as the enciphered common key data DEY from the fourth embodied structure of the common key data generating portion 34 shown in FIG. 12.

Although in the embodiment of apparatus for enciphering and deciphering data shown in FIG. 8, the enciphered key data inserting portion 35 is provided in the enciphering apparatus 32 so that the enciphered common key data DXY obtained from the enciphering processor 37 are inserted into the enciphered HD-SDI signal DHSE obtained from the HD-SDI enciphering processor 33 to produce the composite enciphered HD-SDI signal DHSE+DXY in the enciphered key data inserting portion 35 and the composite enciphered HD-SDI signal DHSE+DXY is transmitted through the data transmission line 38, and the enciphered key data extracting portion 41 is provided in the deciphering apparatus 40 so that the composite enciphered HD-SDI signal DHSE+DXY which is constituted with the enciphered HD-SDI signal DHSE accompanied with the enciphered common key data DXY is received and the enciphered common key data DXY are extracted from the received composite enciphered HD-SDI signal DHSE+DXY in the enciphered key data extracting portion 41, it is also possible to make such an arrangement that a data sending portion for sending the enciphered HD-SDI signal DHSE obtained from the HD-SDI enciphering processor 33 and the enciphered common key data DXY obtained from the enciphering processor 37 separately to be independently transmitted is provided in the enciphering apparatus 32 and a data receiving portion for receiving the enciphered HD-SDI signal DHSE and the enciphered common key data DXY having been independently transmitted is provided in the deciphering apparatus 40.

With the enciphering apparatus 32 used for the embodiment of apparatus for enciphering and deciphering data shown in FIG. 8, the common key data DEY which are used for the enciphering process for producing the enciphered HD-SDI signal DHSE are subjected to the enciphering process using the open key data DOY to produce the enciphered common key data DXY and the enciphered common key data DXY are sent separately from or in accompany with the enciphered HD-SDI signal DHSE. Consequently, the common key data DEY can be reproduced by subjecting the enciphered common key data DXY to the deciphering process using the secret key data DSY to be used for the deciphering process to which the enciphered HD-SDI signal DHSE is subjected to reproduce the HD-SDI signal DHS, and such a fear that the common key data DEY are eavesdropped on its transmission and the enciphered HD-SDI signal DHSE is undesirably deciphered with the eavesdropped common key data DEY can be effectively reduced.

With the deciphering apparatus 40 used for the embodiment of apparatus for enciphering and deciphering data shown in FIG. 8, the enciphered common key data DXY which are produced through the enciphering process using the open key data DOY are subjected to the deciphering process using the secret key data DSY to reproduce the common key data DEY and the common key data DEY are used for the deciphering process to which the enciphered HD-SDI signal DHSE are subjected to reproduce the HD-SDI signal DHS. Consequently, the HD-SDI signal DHS can be surely reproduced based on the enciphered HD-SDI signal DHSE with which such a fear as to be undesirably deciphered is effectively reduced.

Figure 13:
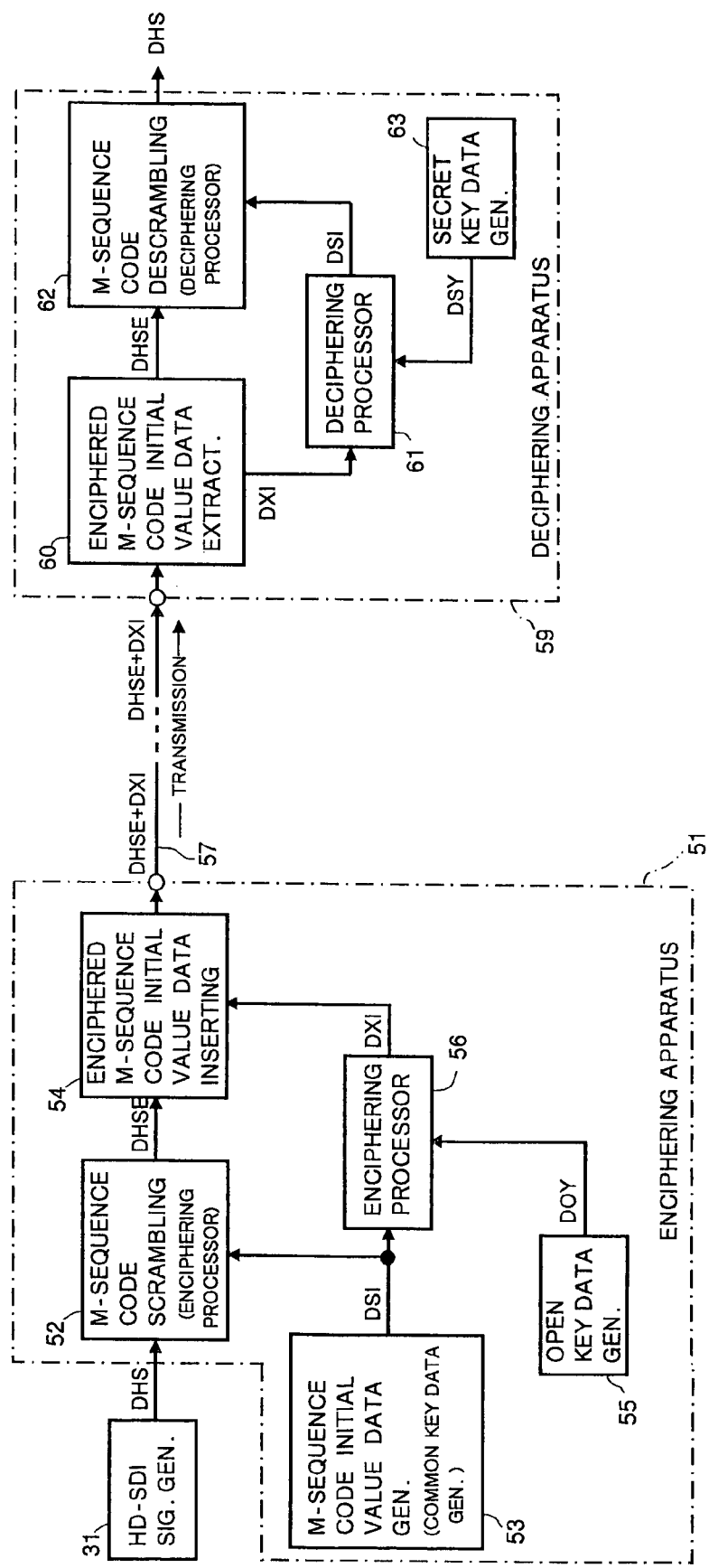
FIG. 13 is a block diagram showing an embodiment of apparatus for enciphering and deciphering data, in which an embodiment of method of enciphering and deciphering data is carried out, and which includes an embodiment of apparatus for enciphering data, in which an embodiment of method of enciphering data is carried out, and an embodiment of apparatus for deciphering data, in which an embodiment of method of deciphering data is carried out.

FIG. 13 shows an embodiment of apparatus for enciphering and deciphering data, in which an embodiment of method of enciphering and deciphering data is carried out, and which includes an embodiment of apparatus for enciphering data, in which an embodiment of method of enciphering data is carried out, and an embodiment of apparatus for deciphering data, in which an embodiment of method of deciphering data is carried out.

Referring to FIG. 13, an HD-SDI signal generating portion 31, which is the same as the HD-SDI signal generating portion 31 in the embodiment of apparatus for enciphering and deciphering data shown in FIG. 8, is provided for sending an HD-SDI signal DHS which constitutes digital information data. The HD-SDI signal DHS obtained from the HD-SDI signal generating portion 31 is supplied, as input digital information data, to an enciphering apparatus 51 which constitutes an embodiment of apparatus for enciphering data, in which an embodiment of method of enciphering data is carried out.

In the enciphering apparatus 51, an M-sequence code initial value data generating portion 53 is provided for sending M-sequence code initial value data DSI. The HD-SDI signal DHS obtained from the HD-SDI signal generating portion 31 and the M-sequence code initial value data DSI obtained from the M-sequence code initial value data generating portion 53 are supplied to an M-sequence code scrambling portion 52.

In the M-sequence code scrambling portion 52, the HD-SDI signal DHS is subjected to scrambling process using M-sequence code, an initial value of which is determined in accordance with the M-sequence code initial value data DSI, to produce enciphered HD-SDI signal DHSE which constitutes enciphered information data based on the HD-SDI signal DHS to be supplied to an enciphered M-sequence code initial value data inserting portion 54.

The encipherment through the scrambling process of the HD-SDI signal DHS in the M-sequence code scrambling portion 52 is carried out in such a manner as mentioned below.

First, the HD-SDI signal DHS is subjected to S/P conversion to be converted into an HD signal as shown in FIG. 6 which contains Y and $P_B/P_R$ data sequences as shown in FIGS. 3A and 3B.

Next, a portion of the HD signal as shown in FIG. 6, which includes video data DVV provided in a portion corresponding to a video data period and time reference code date EAV provided in a starting end of a portion corresponding to a horizontal blanking period in a portion corresponding to a line period of the HD signal, is subjected to the scrambling process using the M-sequence code, the initial value of which is determined in accordance with the M-sequence code initial value data DSI, to produce scrambled video data and scrambled time reference code data EAV. On the other hand, various data provided in the portion corresponding to the horizontal blanking period except the time reference code date EAV, that is, line number data DLN, error detection code data CRCC, ancillary data DAA and time reference code data SAV, are not subjected to the scrambling process but combined with the scrambled video data and the scrambled time reference code data EAV.

As a result, an enciphered HD signal which contains the various data provided in the portion corresponding to the horizontal blanking period except the time reference code date EAV, the enciphered video data successive to the portion corresponding to the horizontal blanking period and the scrambled time reference code data EAV is obtained. Then, the enciphered HD signal thus obtained is subjected to S/P conversion to be converted into the enciphered HD-SDI signal DHSE.

An open key data generating portion 55 is also provided for sending open key data DOY in the enciphering apparatus 51. The M-sequence code initial value data DSI obtained from the M-sequence code initial value data generating portion 53 and the open key data DOY obtained from the open key data generating portion 55 are supplied to an enciphering processor 56.

In the enciphering processor 56, the M-sequence code initial value data DSI are subjected to enciphering process using the open key data DOY, that is, enciphering process in accordance with the rules determined by the open key data DOY, to produce enciphered M-sequence code initial value data DXI to be supplied to the enciphered M-sequence code initial value data inserting portion 54.

In the enciphered M-sequence code initial value data inserting portion 54, the enciphered M-sequence code initial value data DXI are inserted into the enciphered HD-SDI signal DHSE from the M-sequence code scrambling portion 52 to produce composite enciphered HD-SDI signal DHSE+DXI which is constituted with the enciphered HD-SDI signal DHSE accompanied with the enciphered M-sequence code initial value data DXI.

The composite enciphered HD-SDI signal DHSE+DXI are sent from the enciphered M-sequence code initial value data inserting portion 54 to be transmitted from the enciphering apparatus 51. Therefore, the enciphered M-sequence code initial value data inserting portion 54 constitutes a data sending portion for sending the enciphered HD-SDI signal DHSE and the enciphered M-sequence code initial value data DXI to be transmitted.

The composite enciphered HD-SDI signal DHSE+DXI obtained from the enciphered M-sequence code initial value data inserting portion 54 are transmitted from the enciphering apparatus 51 through a data transmission line 57 having one end thereof connected with the enciphered M-sequence code initial value data inserting portion 54 toward the other end of the data transmission line 57. The data transmission line 57 is formed with, for example, a coaxial cable.

The other end of the data transmission line 57 is connected to a deciphering apparatus 59 which constitutes an embodiment of apparatus for deciphering data, in which an embodiment of method of deciphering data is carried out.

In the deciphering apparatus 59, the composite enciphered HD-SDI signal DHSE+DXI, which is constituted with the enciphered HD-SDI signal DHSE accompanied with the enciphered M-sequence code initial value data DXI, having been transmitted through the data transmission line 57 is supplied to an enciphered M-sequence code initial value data extracting portion 60. The enciphered M-sequence code initial value data extracting portion 60 is operative to receive the composite enciphered HD-SDI signal DHSE+DXI and to extract the enciphered M-sequence code initial value data DXI from the composite enciphered HD-SDI signal DHSE+DXY. The enciphered M-sequence code initial value data DXI obtained from the enciphered M-sequence code initial value data extracting portion 60 are supplied to a deciphering processor 61 and the enciphered HD-SDI signal DHSE obtained also from the enciphered M-sequence code initial value data extracting portion 60 is supplied to an M-sequence code descrambling portion 62. Therefore, the enciphered M-sequence code initial value data extracting portion 60 constitutes a data receiving portion for receiving the enciphered HD-SDI signal DHSE and the enciphered M-sequence code initial value data DXI.

A secret key data generating portion 63 is provided also in the deciphering apparatus 59 for sending secret key data DSY which are in a specific corresponding relation with the open key data DOY obtained from the open key data generating portion 55. The secret key data DSY obtained from the secret key data generating portion 63 are supplied to the deciphering processor 61. In the deciphering processor 61, the enciphered M-sequence code initial value data DXI are subjected to deciphering process using the secret key data DSY, that is, deciphering process in accordance with the rules determined by the secret key data DSY, to reproduce the original M-sequence code initial value data DSI to be supplied to the M-sequence code descrambling portion 62.

In the M-sequence code descrambling portion 62, the enciphered HD-SDI signal DHSE obtained from the enciphered M-sequence code initial value data extracting portion 60 is subjected to descrambling process using M-sequence code, an initial value of which is determined in accordance with the M-sequence code initial value data DSI, to reproduce the original HD-SDI signal DHS.

The decipherment through the descrambling process of the enciphered HD-SDI signal DHSE in the M-sequence code descrambling portion 62 is carried out in such a manner as mentioned below.

First, the enciphered HD-SDI signal DHSE is subjected to S/P conversion to be converted into the enciphered HD signal.

Next, the scrambled video data and the scrambled time reference code data EAV in a portion corresponding to a line period of the enciphered HD signal, are subjected to the descrambling process using the M-sequence code, the initial value of which is determined in accordance with the M-sequence code initial value data DSI, to reproduce the original video data DVV and the original time reference code data EAV. The various data provided in the portion corresponding to the horizontal blanking period except the time reference code date EAV, that is, the line number data DLN, the error detection code data CRCC, the ancillary data DAA and the time reference code data SAV, which have not been scrambled, are combined with the reproduced video data VDD and the reproduced time reference code date EAV. As a result, the HD signal, each portion corresponding to the line period of which contains the time reference code data EAV, the line number data DLN, the error detection code data CRCC, the ancillary data DAA and the time reference code data SAV provided in the portion corresponding to the horizontal blanking period and the video data DVV, is obtained. Then, the HD signal thus obtained is subjected to P/S conversion to be converted into the HD-SDI signal DHS.

The HD-SDI signal DHS thus reproduced in the M-sequence code descrambling portion 62 is sent from the deciphering apparatus 59.

In the embodiment of apparatus for enciphering and deciphering data shown in FIG. 13, the M-sequence code initial value data generating portion 53 in the enciphering apparatus 51 corresponds to a common key data generating portion which is operative to send the M-sequence code initial value data DSI as common key data, the M-sequence code scrambling portion 52 in the enciphering apparatus 51 corresponds to an enciphering processor which is operative to subject the HD-SDI signal DHS to enciphering process using the M-sequence code initial value data DSI as the common key data, and the M-sequence code descrambling portion 62 in the deciphering apparatus 59 corresponds to a deciphering portion which is operative to subject the enciphered HD-SDI signal DHSE deciphering process using the reproduced M-sequence code initial value data DSI as the reproduced common key data.

Although in the embodiment of apparatus for enciphering and deciphering data shown in FIG. 13, the enciphered M-sequence code initial value data inserting portion 54 is provided in the enciphering apparatus 51 so that the enciphered M-sequence code initial value data DXI obtained from the enciphering processor 56 are inserted into the enciphered HD-SDI signal DHSE obtained from the M-sequence code scrambling portion 52 to produce the composite enciphered HD-SDI signal DHSE+DXI which is constituted with the enciphered HD-SDI signal DHSE accompanied with the enciphered M-sequence code initial value data DXI in the enciphered M-sequence code initial value data inserting portion 54 and the composed enciphered HD-SDI signal DHSE+DXI is transmitted through the data transmission line 57, and the enciphered M-sequence code initial value data extracting portion 60 is provided in the deciphering apparatus 59 so that the composed enciphered HD-SDI signal DHSE+DXI which is constituted with the enciphered HD-SDI signal DHSE accompanied with the enciphered M-sequence code initial value data DXI is received and the enciphered M-sequence code initial value data DXI are extracted from the received composite enciphered HD-SDI signal DHSE+DXI in the enciphered M-sequence code initial value data extracting portion 60, it is also possible to make such an arrangement that a data sending portion for sending the enciphered HD-SDI signal DHSE obtained from the M-sequence code scrambling portion 52 and the enciphered M-sequence code initial value data DXI obtained from the enciphering processor 56 separately to be independently transmitted is provided in the enciphering apparatus 51 and a data receiving portion for receiving the enciphered HD-SDI signal DHSE and the enciphered M-sequence code initial value data DXI having been independently transmitted is provided in the deciphering apparatus 59.

With the enciphering apparatus 51 used for the embodiment of apparatus for enciphering and deciphering data shown in FIG. 13, the M-sequence code initial value data DSI which are used for the scrambling process using the M-sequence code for producing the enciphered HD-SDI signal DHSE are subjected to the enciphering process using the open key data DOY to produce the enciphered M-sequence code initial value data DXI and the enciphered M-sequence code initial value data DXI are sent separately from or in accompany with the enciphered HD-SDI signal DHSE. Consequently, the M-sequence code initial value data DSI can be reproduced by subjecting the enciphered M-sequence code initial value data DXI to the deciphering process using the secret key data DSY to be used for the descrambling process using the M-sequence code to which the enciphered HD-SDI signal DHSE is subjected to reproduce the HD-SDI signal DHS, and such a fear that the M-sequence code initial value data DSI are eavesdropped on its transmission and the enciphered HD-SDI signal DHSE is undesirably deciphered with the eavesdropped M-sequence code initial value data DSI can be effectively reduced.

With the deciphering apparatus 59 used for the embodiment of apparatus for enciphering and deciphering data shown in FIG. 13, the enciphered M-sequence code initial value data DXI which are produced through the enciphering process using the open key data DOY are subjected to the deciphering process using the secret key data DSY to reproduce the M-sequence code initial value data DSI and the M-sequence code initial value data DSI are used for the descrambling process using the M-sequence code to which the enciphered HD-SDI signal DHSE are subjected to reproduce the HD-SDI signal DHS. Consequently, the HD-SDI signal DHS can be surely reproduced based on the enciphered HD-SDI signal DHSE with which such a fear as to be undesirably deciphered is effectively reduced.

APPLICABILITY FOR INDUSTRIAL USE

As apparent from the above description, with the method of enciphering data or the apparatus for enciphering data, the common key data which are used for the enciphering process for producing the enciphered information data are subjected to the enciphering process using the open key data to produce the enciphered common key data and the enciphered common key data are sent separately from or in accompany with the enciphered information data. Consequently, the original common key data can be reproduced by subjecting the enciphered common key data to the deciphering process using the secret key data to be used for the deciphering process to which the enciphered information data are subjected to reproduce the original digital information data, and such a fear that the common key data are eavesdropped on its transmission and the enciphered information data are undesirably deciphered with the eavesdropped common key data can be effectively reduced.

With the method of enciphering data or the apparatus for enciphering data, the M-sequence code initial value data which are used for the scrambling process using the M-sequence code for producing the enciphered information data are subjected to the enciphering process using the open key data to produce the enciphered M-sequence code initial value data and the M-sequence code initial value data are sent separately from or in accompany with the enciphered information data. Consequently, the original M-sequence code initial value data can be reproduced by subjecting the enciphered M-sequence code initial value data to the deciphering process using the secret key data to be used for the descrambling process to which the enciphered information data are subjected to reproduce the original digital information data, and such a fear that the M-sequence code initial value data are eavesdropped on its transmission and the enciphered information data are undesirably descrambled with the M-sequence code having the initial value determined in accordance with the eavesdropped M-sequence code initial value data can be effectively reduced.

With the method of deciphering data or the apparatus for deciphering data, the enciphered common key data which are produced through the enciphering process using the open key data are subjected to the deciphering process using the secret key data to reproduce the original common key data and the original common key data are used for the deciphering process to which the enciphered information data are subjected to reproduce the original digital information data. Consequently, the original digital information data can be surely reproduced based on the enciphered information data with which such a fear as to be undesirably deciphered is effectively reduced.

With the method of deciphering data or the apparatus for deciphering data the enciphered M-sequence code initial value data which are produced through the enciphering process using the open key data are subjected to the deciphering process using the secret key data to reproduce the original M-sequence code initial value data and the original M-sequence code initial value data are used for the descrambling process using the M-sequence code to which the enciphered information data are subjected to reproduce the original digital information data. Consequently, the original digital information data can be surely reproduced based on the enciphered information data with which such a fear as to be undesirably deciphered is effectively reduced.

With the method of enciphering and deciphering data or the apparatus for enciphering data, the common key data which are used for the enciphering process for producing the enciphered information data are subjected to the enciphering process using the open key data to produce the enciphered common key data and the enciphered common key data are sent separately from or in accompany with the enciphered information data, and the enciphered common key data which are produced through the enciphering process using the open key data are subjected to the deciphering process using the secret key data to reproduce the original common key data and the original common key data are used for the deciphering process to which the enciphered information data are subjected to reproduce the original digital information data. Consequently, such a fear that the common key data are eavesdropped on its transmission and the enciphered information data are undesirably deciphered with the eavesdropped common key data can be effectively reduced and the original digital information data can be surely reproduced based on the enciphered information data.

With the method of enciphering and deciphering data or the apparatus for enciphering data, the M-sequence code initial value data which are used for the scrambling process using the M-sequence code for producing the enciphered information data are subjected to the enciphering process using the open key data to produce the enciphered M-sequence code initial value data and the M-sequence code initial value data are sent separately from or in accompany with the enciphered information data, and the enciphered M-sequence code initial value data which are produced through the enciphering process using the open key data are subjected to the deciphering process using the secret key data to reproduce the original M-sequence code initial value data and the original M-sequence code initial value data are used for the descrambling process using the M-sequence code to which the enciphered information data are subjected to reproduce the original digital information data. Consequently, such a fear that the M-sequence code initial value data are eavesdropped on its transmission and the enciphered information data are undesirably descrambled with the M-sequence code having the initial value determined in accordance with the eavesdropped M-sequence code initial value data can be effectively reduced and the original digital information data can be surely reproduced based on the enciphered information data.

The invention claimed is:

1. A method of enciphering data comprising the steps of:
   subjecting digital information data to enciphering process by an enciphering apparatus using initial common key data (DKI) for a predetermined time and thereafter using common key data (DEY) for producing enciphered information data,
   subjecting the common key data (DEY) to enciphering process using open key data (DOY) for producing enciphered key data (DXY), and sending a signal including both the enciphered information data and the enciphered key data (DXY);
   wherein in a deciphering process while the enciphered key data (DXY) is being deciphered, the initial common key data (DKI), which are previously set, are used to decipher the enciphered information data, and after the predetermined time from the start of the deciphering process, once the enciphered key data (DXY) is deciphered to produce the common key data (DEY), the common key data (DEY) are used to decipher the enciphered information data and wherein the digital information data is a high definition (HD) digital signal.

2. A method of enciphering data according to claim 1 wherein the enciphered information data and the enciphered key data are transmitted through a common data transmission line.

3. A method of enciphering data according to claim 1, wherein the enciphered key data are inserted into the enciphered information data to produce composite enciphered information data to be sent.

4. A method of enciphering data according to claim 1, wherein random number data varying in response to timer output data are produced to be used as the common key data.

5. A method of enciphering data according to claim 1, wherein a random number data sequence lacking reproducibility is constituted with a predetermined number of random number data generated on demand and the random number data contained in the random number data sequence are used as the common key data.

6. A method of enciphering data according to claim 1 wherein a random number data sequence lacking reproducibility is constituted with a predetermined number of random number data generated on demand and renewed key data, which is renewed in accordance with the random number data contained in the random number data sequence, are produced based on the initial common key data, wherein the renewed key data is to be used as the common key data.

7. A method of deciphering data comprising the step of:
   receiving at a deciphering apparatus a signal including both enciphered information data and enciphered key data (DXY),
   extracting the enciphered information data and the enciphered key data (DXY) from the signal,
   subjecting the extracted enciphered key data (DXY) to a deciphering process using secret key data (DSY) to obtain original common key data (DEY), and when the enciphered information starts being received, in place of the original common key data (DEY) subjecting the extracted enciphered information data to a deciphering process using generated initial common key data (DKI) which is previously set and initially used to encipher the information data, for a predetermined time;
   subjecting the enciphered information data to a deciphering process using the original common key data (DEY) for reproducing original digital information data, and wherein the digital information data is a high definition (HD) digital signal.

8. A method of deciphering data according to claim 7, wherein the enciphered information data and the enciphered key data are received in the form of composite enciphered information data in which the enciphered key data are inserted into the enciphered information data and the enciphered key data are extracted from the composite enciphered information data.

9. A method of enciphering and deciphering data comprising the steps of:
   subjecting digital information data to enciphering process at an enciphering apparatus using initial common key data (DKI) for a predetermined time and thereafter using common key data (DEY) for producing enciphered information data,
   subjecting the common key data (DEY) to enciphering process using open key data (DOY) for producing enciphered key data (DXY),
   sending a signal including both the enciphered information data and the enciphered key data (DXY),
   receiving at a deciphering apparatus the signal including the enciphered information data and the enciphered key data (DXY),
   subjecting the enciphered key data (DXY) to deciphering process using secret key data (DSY) to obtain the common key data (DEY), and when the enciphered information data starts being received, in place of the original common key data (DEY), subjecting the enciphered information data to a deciphering process using the initial common key data (DKI) which is previously set for a predetermined time;
   subjecting the enciphered information data to deciphering process using the common key data (DEY) for reproducing the digital information data, and wherein the digital information data is a high definition (HD) digital signal.

10. An apparatus for enciphering data comprising:
    a key data generating portion for generating initial common key data (DKI) and common key data (DEY),
    a first enciphering processor for subjecting digital information data to first enciphering process using the generated initial common key data (DKI) for a predetermined time and thereafter using the generated common key data (DEY) obtained from the key data generating portion for producing enciphered information data,
    a second enciphering processor for subjecting the generated common key data (DEY) obtained from the key data generating portion to second enciphering process using open key data (DOY) for producing enciphered key data (DXY), and
    a data sending portion for sending a signal including both the enciphered information data and the enciphered key data (DXY);
    wherein in a deciphering process when transmission of the enciphered information starts, the initial common key data (DKI), which are previously set, arc used to decipher the enciphered information data in place of the common key data (DEY), and the reproduction of the common key data (DEY) are performed based on the enciphered key data (DXY) with a predetermined delay, wherein the digital information data is a high definition (HD) digital signal.

11. An apparatus for enciphering data according to claim 10, wherein the data sending portion is operative to send the enciphered information data and the enciphered key data to be transmitted through a common data transmission line.

12. An apparatus for enciphering data according to claim 10, wherein the data sending portion comprises an enciphered key data inserting portion for inserting the enciphered key data into the enciphered information data for producing composite enciphered information data to be sent.

13. An apparatus for enciphering data according to claim 10, wherein the key data generating portion comprises a timer and a random number data generating portion for producing random number data varying in response to timer output data obtained from the timer, and the random number data obtained from the random number data generating portion are used as said generated common key data.

14. An apparatus for enciphering data according to claim 10, wherein the key data generating portion comprises initial key data generating portion for generating the initial common key data, a timer, a random number data generating portion for producing random number data varying in response to timer output data obtained from the timer and a renewed key data generating portion for producing renewed key data which is renewed in accordance with the random number data based on the initial common key data obtained from the initial key data generating portion, and the renewed key data obtained from the renewed key data generating portion are used as said generated common key data.

15. An apparatus for enciphering data according to claim 10, wherein the key data generating portion comprises a random number data sequence generating portion for producing a random number data sequence lacking reproducibility and constituted with a predetermined number of random number data generated on demand and the random number data contained in the random number data sequence obtained from the random number data sequence generating portion are used as said generated common key data.

16. An apparatus for enciphering data according to claim 10, wherein the key data generating portion comprises an initial key data generating portion for generating the initial common key data, a random number data sequence generating portion for producing a random number data sequence lacking reproducibility and constituted with a predetermined number of random number data generated on demand, and a renewed key data generating portion for producing renewed key data which is renewed in accordance with the random number data contained in the random number data sequence obtained from the random number data sequence generating portion based on the initial common key data obtained from the initial key data generating portion, and the renewed key data obtained from the renewed key data generating portion are used as said generated common key data.

17. An apparatus for deciphering data comprising:
a data receiving portion for receiving a signal containing both enciphered information data and enciphered key data (DXY),
a secret key data generating portion for generating secret key data (DSY),
a first deciphering processor for subjecting the enciphered key data (DXY) to deciphering process using the secret key data (DSY) obtained from the secret key data generating portion to obtain original common key data (DEY) which was used to encipher the information data and
a second deciphering processor for subjecting the enciphered information data to a deciphering process when the enciphered information starts being received using an initial common key data (DKI), which is previously set and initially used to encipher the information data, in place of the original common key data (DEY), and the reproduction of the original common key data (DEY) are performed based on the enciphered key data (DXY) with a predetermined delay, and wherein the digital information data is a high definition (HD) digital signal.

18. An apparatus for deciphering data according to claim 17, wherein the data receiving portion is operative to receive the enciphered information data and the enciphered key data in the form of composite enciphered information data in which the enciphered key data are inserted into the enciphered information data and to extract the enciphered key data from the composite enciphered information data.

19. An apparatus for enciphering and deciphering data comprising:
a first initial key generating portion for generating initial common key data (DKI),
a key data generating portion for generating common key data (DEY) based upon the initial common key data (DKI),
a first enciphering processor for subjecting digital information data to first enciphering process using the generated initial common key data (DKI) for a predetermined time and thereafter using the generated common key data (DEY) obtained from the key data generating portion for producing enciphered information data,
a second enciphering processor for subjecting the generated common key data (DEY) obtained from the key data generating portion to second enciphering process using open key data (DOY) for producing enciphered key data (DXY),
a data sending portion for sending a signal including both the enciphered information data and the enciphered key data (DXY),
a data receiving portion for receiving the signal including the enciphered information data and the enciphered key data (DXY),
a second initial key generating portion for setting and generating the initial common key data (DKI);
a secret key data generating portion for generating secret key data (DSY),
a first deciphering portion for subjecting the enciphered key data (DXY) to deciphering process using the secret key data (DSY) obtained from the secret key data generating portion to obtain the common key data (DEY), and
a second deciphering portion for subjecting the enciphered information data to a deciphering process, when the enciphered information starts being received, using the initial common key data (DKI) from the second initial key generating portion in place of the common data (DEY), and, subjecting the enciphered information data to a deciphering process using the common key data (DEY) to reproduce the digital information data, and wherein the digital information data is a high definition (HD) digital signal.

* * * * *